(12) United States Patent  
Takeda et al.

(10) Patent No.: US 11,589,378 B2  
(45) Date of Patent: Feb. 21, 2023

(54) TERMINAL AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/922,433

(22) Filed: Jul. 7, 2020

(65) Prior Publication Data

US 2020/0337078 A1  Oct. 22, 2020

Related U.S. Application Data

(63) Continuation of application No. 16/072,655, filed as application No. PCT/JP2017/002425 on Jan. 25, 2017, now abandoned.

(30) Foreign Application Priority Data

Jan. 27, 2016 (JP) .............................. JP2016-013686

(51) Int. Cl.
  *H04W 72/12* (2009.01)
  *H04W 16/28* (2009.01)
  *H04W 72/04* (2023.01)
  *H04L 5/00* (2006.01)
  *H04W 72/044* (2023.01)

(52) U.S. Cl.
  CPC ....... *H04W 72/1289* (2013.01); *H04L 5/0048* (2013.01); *H04W 16/28* (2013.01); *H04W 72/04* (2013.01); *H04W 72/046* (2013.01)

(58) Field of Classification Search
  CPC . H04W 72/1289; H04W 16/28; H04W 72/04; H04W 72/046; H04L 5/0048
  See application file for complete search history.

(56) References Cited

U.S. PATENT DOCUMENTS

| 8,416,872 B2 | 4/2013 | Higuchi et al. |
| 9,281,926 B2 | 3/2016 | Kishiyama et al. |
| 2010/0014490 A1 | 1/2010 | Kishiyama et al. |
| 2013/0286960 A1 | 10/2013 | Li et al. |

(Continued)

FOREIGN PATENT DOCUMENTS

| CN | 103563469 A | 2/2014 |
| CN | 104620551 A | 5/2015 |

(Continued)

OTHER PUBLICATIONS

Office Action issued in the counterpart European Patent Application No. 17744222.5, dated Jan. 13, 2021 (5 pages).

(Continued)

*Primary Examiner* — Samina F Choudhry
(74) *Attorney, Agent, or Firm* — Osha Bergman Watanabe & Burton LLP

(57) ABSTRACT

A terminal is disclosed that includes a receiver that receives downlink control information using search space including a plurality of subsets to which precoding is applied and a processor that controls to perform transmission or reception of a shared channel based on the downlink control information. In other aspects, a radio communication method for a terminal is also disclosed.

7 Claims, 12 Drawing Sheets

(56) References Cited

U.S. PATENT DOCUMENTS

| | | | |
|---|---|---|---|
| 2014/0226551 A1 | 8/2014 | Ouchi et al. | |
| 2014/0301283 A1* | 10/2014 | Frenne | H04B 7/0413 370/329 |
| 2014/0301346 A1 | 10/2014 | Seo et al. | |
| 2014/0321399 A1 | 10/2014 | Liu et al. | |
| 2015/0003360 A1* | 1/2015 | Liu | H04W 72/1278 370/329 |
| 2016/0029351 A1 | 1/2016 | Shimezawa et al. | |
| 2016/0127102 A1* | 5/2016 | Kim | H04L 5/0026 370/330 |
| 2016/0192388 A1* | 6/2016 | Ekpenyong | H04L 5/0092 370/329 |
| 2019/0335429 A1 | 10/2019 | Takeda et al. | |
| 2021/0288766 A1 | 9/2021 | Horiuchi et al. | |

FOREIGN PATENT DOCUMENTS

| | | |
|---|---|---|
| EP | 2800433 A1 | 11/2014 |
| JP | 2007-028569 A | 2/2007 |
| JP | 2008-092375 A | 4/2008 |
| JP | 2010-219817 A | 9/2010 |
| WO | 2014/141920 A1 | 9/2014 |
| WO | 2018/124027 A1 | 7/2018 |

OTHER PUBLICATIONS

International Search Report issued in PCT/JP2017/002425 dated Mar. 28, 2017 (2 pages).

Written Opinion of the International Searching Authority issued in PCT/JP2017/002425 dated Mar. 28, 2017 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Office Action issued in the counterpart Chilean Patent Application No. 201802011, dated May 6, 2019 (15 pages).

Extended European Search Report issued in European Application No. 17744222.5, dated Jun. 28, 2019 (7 pages).

Notice of Reasons for Refusal issued in Japanese Application No. 2017-564284, dated Feb. 9, 2021 (6 pages).

Office Action issued in the counterpart Chinese Patent Application No. 201780008541.0, dated May 8, 2021 (23 pages).

Office Action issued in the counterpart Japanese Patent Application No. 2017-564284, dated Oct. 20, 2020 (4 pages).

Office Action issued in Chinese Application No. 201780008541.0; dated Nov. 19, 2021 (17 pages).

3GPP TS 36.211 V13.0.0, "3rd Generation Partnership Project; Technical Specification Group Radio Access Network Evolved Universal Terrestrial Radio Access (E-UTRA); Physical channels and modulation (Release 13)", Dec. 2015 (142 pages).

Office Action issued in the counterpart European Patent Application No. 17744222.5, dated Mar. 24, 2022 (7 pages).

Office Action issued in the counterpart Chinese Patent Application No. 201780008541.0, dated Mar. 16, 2022 (31 pages).

* cited by examiner

TERMINAL AND RADIO COMMUNICATION METHOD

CROSS-REFERENCE TO RELATED APPLICATIONS

This application is a continuation application and, thereby, claims benefit under 35 U.S.C. § 120 to U.S. patent application Ser. No. 16/072,655, filed on Jul. 25, 2018, titled "USER TERMINAL, RADIO BASE STATION, AND RADIO COMMUNICATION METHOD," which is a national stage application of PCT Application No. PCT/JP2017/002425, filed on Jan. 25, 2017, which claims priority to Japanese Patent Application No. 2016-013686, filed on Jan. 27, 2016. The contents of these applications are incorporated by reference in their entirety.

TECHNICAL FIELD

The present invention relates to a user terminal, a radio base station, and a radio communication method of a next-generation communication system.

BACKGROUND ART

In UMTS (Universal Mobile Telecommunications System) networks, for purposes of higher data rates, lower delay and the like, Long Term Evolution (LTE) has been specified (Non-Patent Document 1). Further, for purposes of wider bands and higher speed than LTE (also referred to as LTE Rel.8 or 9), LTE-A (also referred to as LTE Advanced or LTE Rel.10, 11 or 12) has been specified, and a successor system of LTE (also referred to as, for example, FRA (Future Radio Access), 5G (5th generation mobile communication system), or LTE Rel.13/14/15 and subsequent versions) has also been studied.

According to LTE Rel.10/11, for a purpose of a wider band, Carrier Aggregation (CA) of integrating a plurality of Component Carriers (CCs) has been introduced. Each CC is comprised of a system band according to LTE Rel. 8 as one unit. Further, according to the CA, a plurality of CCs of an identical radio base station (eNB: eNodeB) is configured to a user terminal (UE: User Equipment).

Meanwhile, according to LTE Rel.12, Dual Connectivity (DC) of configuring a plurality of Cell Groups (CG) of different radio base stations to a UE has also been introduced. Each cell group is comprised of at least one cell (CC). The DC integrates a plurality of CCs of the different radio base stations, and therefore the DC is also referred to as Inter-base station CA (Inter-eNB CA).

Further, according to LTE Rel.8 to 12, Frequency Division Duplex (FDD) of performing Downlink (DL) transmission and Uplink (UL) transmission at different frequency bands, and Time Division Duplex (TDD) of temporally switching downlink transmission and uplink transmission at the same frequency band have been introduced.

CITATION LIST

Non-Patent Literature

[Non-Patent Literature 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communications systems (e.g. LTE Rel.14/15 and subsequent versions and 5G) are requested to realize various radio services under high request conditions. The radio services such as a MBB (Mobile Broad Band), IoT (Internet of Things), MTC (Machine Type Communication), M2M (Machine To Machine) and URLLC (Ultra Reliable and Low Latency Communications) have also been studied. In this regard, M2M may be referred to as D2D (Device To Device) and V2V (Vehicular To Vehicular) depending on devices that perform communication.

For example, MBB is requested to satisfy a communication capacity and high frequency use efficiency that are 1000 times as those of LTE. Further, IoT, MTC and M2M are requested to satisfy a simultaneous capacity and high energy efficiency that are 100 times as those of LTE. Furthermore, URLLC is requested to satisfy lower delay and super high quality.

Using Massive MIMO (Multiple Input Multiple Output) that uses super multi-element antennas is studied to satisfy a request for various types of communication. Each super multi-element antenna can form a beam (antenna directivity) by controlling an amplitude and/or a phase of a signal transmitted/received by each element. The processing is referred to as Beam Forming (BF), too, and can reduce radio wave propagation loss.

In this regard, when a frequency band is higher, more antenna elements (MIMO elements) can be mounted on the same area. Further, by narrowing a beam, it is possible to increase a Signal-to-Noise ratio (SN ratio) while suppressing other cell interferences.

However, in actual environment (multipath environment in particular), movement of a UE and coverage of an obstacle fluctuate a propagation path and loss. There is a case where, when the propagation path changes while a beam is narrowed, the UE deviates from the beam. There is a problem that, once the UE deviates from the beam, a throughput and communication quality deteriorate until an appropriate beam is selected.

The present invention has been made in view of such a respect, and one of objects of the present invention is to provide a user terminal, a radio base station, and a radio communication method that can prevent deterioration of a throughput and communication quality during communication that uses beam forming.

Solution to Problem

A user terminal according to one aspect of the present invention includes: a reception section that receives a plurality of pieces of downlink control information related to scheduling of data of an identical carrier; and a control section that performs control to select one of the plurality of pieces of downlink control information, and transmit or receive the data based on the selected downlink control information, and each downlink control information is transmitted by using a different beam.

Advantageous Effects of Invention

According to the present invention, it is possible to prevent deterioration of a throughput and communication quality during communication that uses beam forming.

DESCRIPTION OF EMBODIMENT

According to existing LTE systems (Rel.8 to 12), a radio base station (eNB: evolved Node B) schedules transmission and reception of data by using a downlink control channel for a user terminal (UE: User Equipment). More specifically, DL scheduling and UL scheduling based on Downlink Control Information (DCI) notified on a PDCCH (Physical Downlink Control Channel)/EPDCCH(Enhanced PDCCH) are defined.

Figure 1:
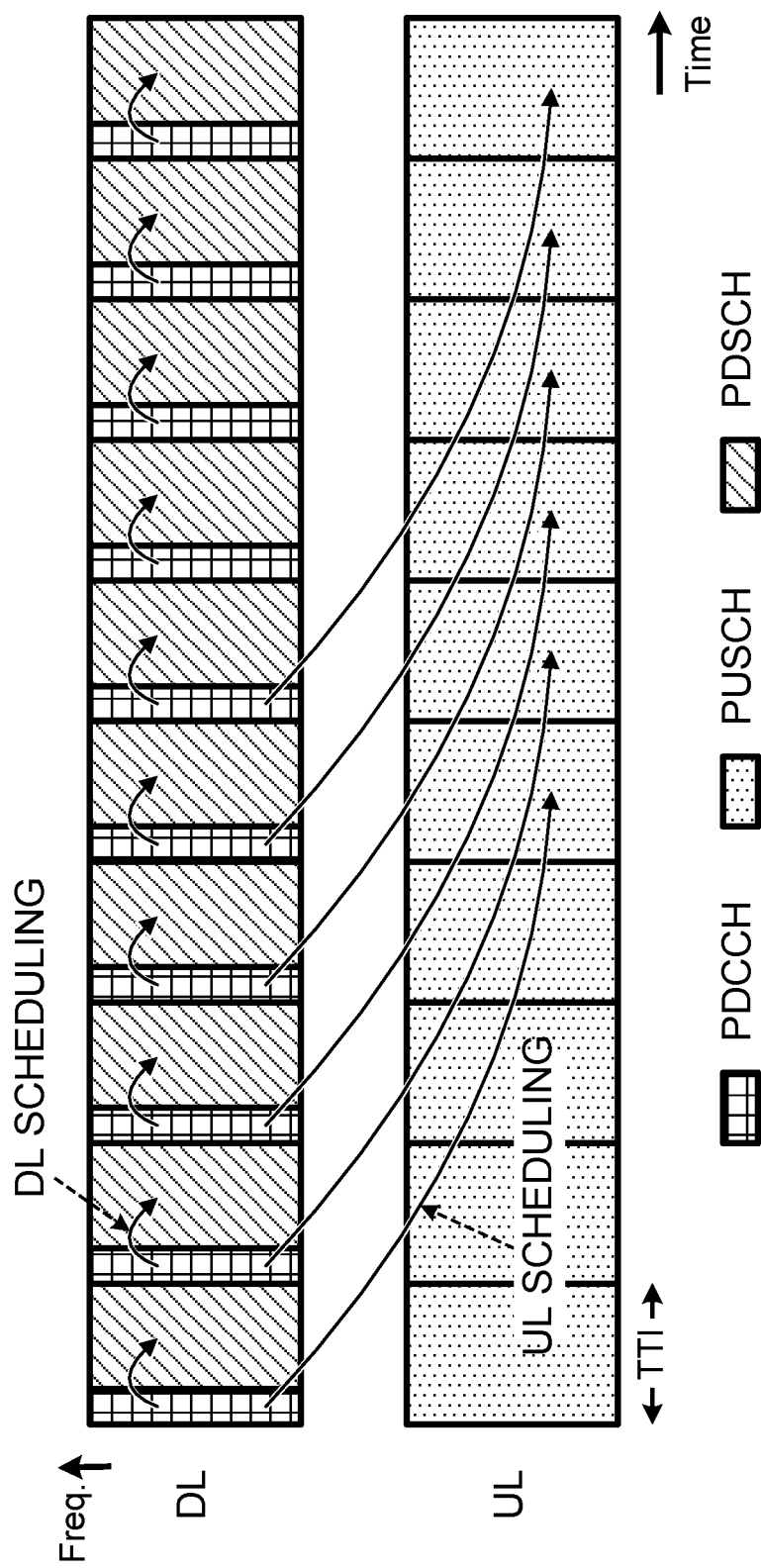
FIG. 1 is a diagram illustrating an example of scheduling of data in an existing LTE system.

FIG. 1 is a diagram illustrating an example of scheduling of data in an existing LTE system. FIG. 1 illustrates DL scheduling and UL scheduling instructed by DCI received on the PDCCH. As illustrated in FIG. 1, a UE receives, for example, a PDSCH (Physical Downlink Shared Channel) based on a DL grant (also referred to as a DL assignment (downlink assignment)) in the same subframe as a subframe in which the DL grant according to a DCI format 1A is detected.

Further, the UE receives, for example, a PUSCH (Physical Uplink Shared Channel) based on a UL grant (uplink grant) in a subframe that is a predetermined period after (e.g. after four subframes) from a subframe in which the UL grant according to a DCI format 0/4 is detected.

According to existing LTE, blind decoding of DCI is performed on a plurality of downlink control channel candidates (e.g. PDCCH candidates), and one DL assignment and one UL grant are detected at maximum, respectively.

In this regard, the UL grant is downlink control information for scheduling transmission of uplink data, and may be referred to as uplink scheduling information or uplink scheduling control information. Further, the DL assignment is downlink control information for scheduling reception of downlink data, and may be referred to as downlink scheduling information or downlink scheduling control information. Furthermore, downlink control information (downlink control signal) may be referred to as, for example, L1/L2 (Layer 1/Layer 2) control information (L1/L2 control signal) or may be referred to simply as L1 control information (L1 control signal). In this regard, a name of each information is not limited to the above examples.

Further, a subframe may be referred to as a Transmission Time Interval (TTI). A TTI (subframe) length according to LTE Rel.8 to 12 is 1 ms, and is comprised of two time slots. The TTI is a transmission time unit of a data packet (transport block) subjected to channel coding, and is a processing unit such as scheduling and link adaptation.

FIG. 1 illustrates an example where the UL/DL grant is notified by the PDDCH. However, even in a case of the EPDCCH, a correspondence between TTIs to be scheduled and TTIs to be scheduled is the same as that in FIG. 1. Further, carriers (Component Carriers (CCs) and cells) for transmitting and receiving a DL grant and a PDSCH may not be the same and may be different carriers. Furthermore, carriers for transmitting and receiving an UL grant and a PUSCH may be the same and may be different carriers.

Still further, the existing LTE system uses retransmission control according to HARQ (Hybrid Automatic Repeat reQuest). According to HARQ, a reception side feeds back transmission acknowledgement information (referred to as, for example, retransmission control information, HARQ-ACK, or ACK/NACK (A/N: Acknowledgement/Negative-Acknowledgement)), so that a transmission side can determine whether to retransmit data or transmit new data. In this regard, the transmission acknowledgement information may be notified by not transmitting ACK/NACK (Discontinuous Transmission (DTX)). That is, when a reception side (an eNB or the UE) cannot detect the ACK/NACK from a transmission side (the UE or the eNB), the reception side can interpret transmission acknowledgement information of corresponding data as NACK.

By the way, using Massive MIMO (Multiple Input Multiple Output) that uses super multi-element antennas is studied for future radio communication systems. Each super multi-element antenna can form a beam (antenna directivity) by controlling an amplitude and/or a phase of a signal transmitted/received by each element. The processing is referred to as Beam Forming (BF), too, and can reduce radio wave propagation loss.

However, in actual environment (multipath environment in particular), movement of a UE and coverage of an obstacle fluctuate a propagation path and loss. There is a case where, when the propagation path changes while a beam is narrowed, the UE deviates from the beam. There is a problem that, once the UE deviates from the beam, a throughput and communication quality deteriorate until an appropriate beam is selected.

Hence, the inventors of the present invention have conceived transmitting a L1/L2 control signal (e.g. a DL assignment or an UL grant) indicating the same type of control with respect to a given UE by using a plurality of different beams. According to one embodiment of the present invention, the UE can perform communication by receiving at least one of a plurality of different beams, so that it is possible to improve robustness against beam tracking and prevent deterioration of a throughput or communication quality.

An embodiment according to the present invention will be described in detail below with reference to the drawings. A radio communication method according to the embodiment may be applied alone or may be applied in combination.

In this regard, a plurality of different beams indicates that, for example, at least one of following (1) to (6) applied to a plurality of beams is different yet is not limited to this: (1) precoding, (2) transmission power, (3) phase rotation, (4) beam width, (5) beam angle (e.g. tilt angle) and (6) the number of layers. In this regard, when precoding is different, a precoding weight may be different or a precoding scheme (e.g. linear precoding or non-linear precoding) may be different. When the linear/non-linear precoding is applied to beams, transmission power, phase rotation and the number of layers may also change.

The linear precoding is, for example, precoding that complies with a Zero-Forcing (ZF) rule, a Regularized Zero-Forcing (R-ZF) rule, or a Minimum Mean Square Error (MMSE) rule. Further, the non-linear precoding is, for example, precoding such as Dirty Paper Coding (DPC), Vector perturbation (VP) and THP (Tomlinson Harashima precoding). In this regard, precoding to be applied is not limited to this.

(Radio Communication Method)

According to one embodiment of the present invention, different beam control (beam forming) is performed on a plurality of pieces of scheduling information. An eNB performs different beam control (e.g. different precoding) on a plurality of control signal candidates subjected to blind decoding by the UE on a L1/L2 control channel.

More specifically, the eNB permits a predetermined UE to perform different beam control on two or more control signals (e.g. DL assignments or UL grants) and transmit the control signals. In this regard, the two or more control signals to which the different beam control is applied may be the same control signal (e.g. DCI whose all bit fields completely match) or may be control signals of different contents (e.g. DCI whose at least part of bit fields are different).

Meanwhile, the UE performs blind decoding on the L1/L2 control channel similar to an operation of the existing system. More specifically, the UE monitors a Search Space (SS) of the PDCCH to detect downlink control information. The search space is comprised of a partition (also referred to as a PDCCH candidate) to which downlink control information can be allocated. The UE detects (also referred to as blind detection or blind detection and decoding) in which PDCCH candidate the downlink control information is included. In this regard, one PDCCH candidate is comprised of one or more Control Channel Elements (CCE).

In this regard, in the existing LTE system, the search space is determined by using a Cell-Radio Network Temporary Identify (C-RNTI), a transmission subframe number, a PDCCH candidate index, the number of CCEs and an aggregation level yet is not limited to these.

Further, another control channel may be used instead of a PDCCH. For example, the search space may relate to an Enhanced PDCCH (EPDCCH) or a PDCCH candidate or a CCE may be read as an EPDCCH candidate or an ECCE (Enhanced CCE).

Allocation units of different beams include, for example, following two types: (1) subset units obtained by dividing an entire search space of the L1/L2 control signal and (2) one or more PDCCH candidate units of the L1/L2 control signal. In this regard, different beams may be controlled in units other than these units. Specific processing of the eNB and the UE will be described below.

In this regard, in the embodiment according to the present invention, the UE may be notified of at least one of various pieces of information described below by higher layer signaling (e.g. RRC signaling and broadcast information (MIB (Master Information Block) and a SIB (System Information Block)), physical layer signaling (e.g. DCI) or a combination of these.

[Beam Forming that is Different Per Search Space Subset]

In a case of above (1), the UE configures a search space subset and a reference signal used to demodulate a PDCCH candidate in the subset. For example, the eNB may notify the UE of information related to a correspondence between search set subsets indices and configurations of reference signals (e.g. radio resource positions, sequences and reference signal indices) used for demodulation.

The UE can perform reception processing to demodulate a search space subset #1 by using a RS #1, and demodulate a search space subset #2 by using a RS #2.

In this regard, the UE may be notified of information related to a search space subset, and may receive, for example, information related to radio resources of a search space, information related to the number of subsets included in a search space and information related to a PDCCH candidate that configures each subset. Further, the UE may be notified of information related to a reference signal used to demodulate a PDCCH candidate, and may receive, for example, information related to a configuration of a reference signal used for demodulation.

The reference signal used to demodulate a PDCCH candidate may be referred to as a DeModulation Reference Signal (DMRS), a user terminal specific Reference Signal (UE-specific Reference Signal) and a PDCCH-DMRS, and other names may be used. A reference signal used to demodulate a PDCCH candidate is also referred to simply as a Reference Signal (RS).

FIGS. 2A to 2D are diagrams illustrating examples of radio resource allocation in a case where different beam forming is performed per search space subset. FIGS. 2A to 2D illustrate the two search subsets (SS subsets #1 and #2) and radio resources to which the reference signals (RS #1 and #2) used to demodulate a PDCCH candidate in each subset are allocated. Further, another arbitrary signal (e.g. data signal) may be allocated to a blank domain in FIGS. 2A to 2D.

In this regard, each of domains surrounded by each square in FIGS. 2A to 2D may be one Resource Element (RE), may be a domain comprised of a plurality of resource elements or may be comprised of time and frequency resource domains of other sizes. Further, the numbers, sizes and positions of domains allocated to each signal/channel according to the present invention are not limited to examples in FIGS. 2A to 2D. Furthermore, the size of each subset or the number of PDCCHs in each subset may be the same or may be different.

Figure 2B:
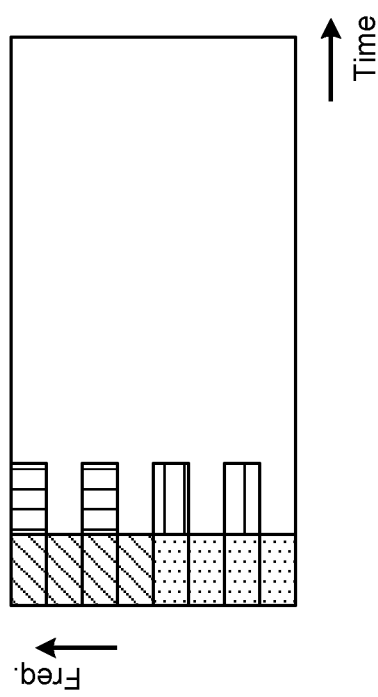
FIGS. 2A to 2D are diagrams illustrating examples of radio resource allocation in a case where different beam forming is performed per search space subset.
Figure 2D:
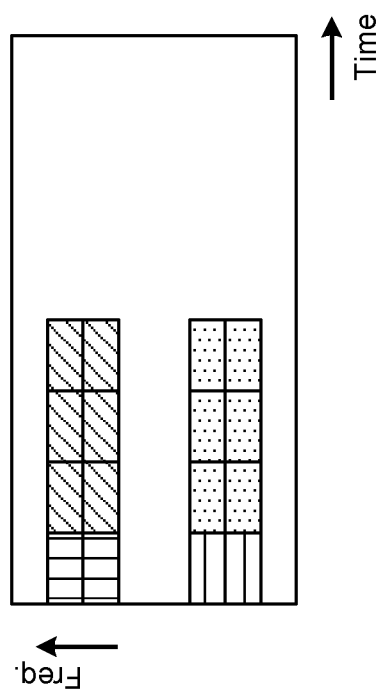
Figure 2A:
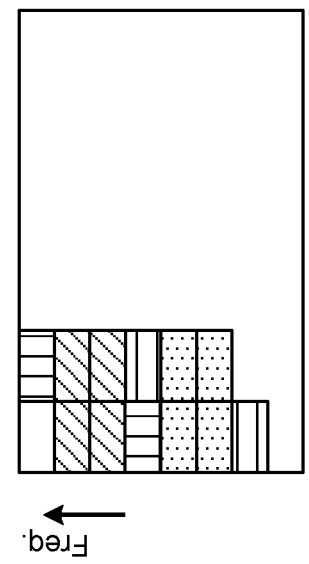

FIG. 2A illustrates an example where a L1/L2 control signal is allocated to be subjected to Time Division Multiplexing (TDM) with another signal. In this example, the RS is transmitted such that the RS is neighboring (comes subsequent) to a corresponding search space subset in a time direction.

FIG. 2B illustrates an example where a L1/L2 control signal is allocated to be subjected to TDM and Frequency Division Multiplexing (FDM) with another signal. In this example, the RS is transmitted such that the RS is neighboring to (precedes) a corresponding search space subset in the time direction. In this regard, both of the RS that precedes and the RS that subsequently comes in the time direction compared to a subset may be used.

Figure 2C:
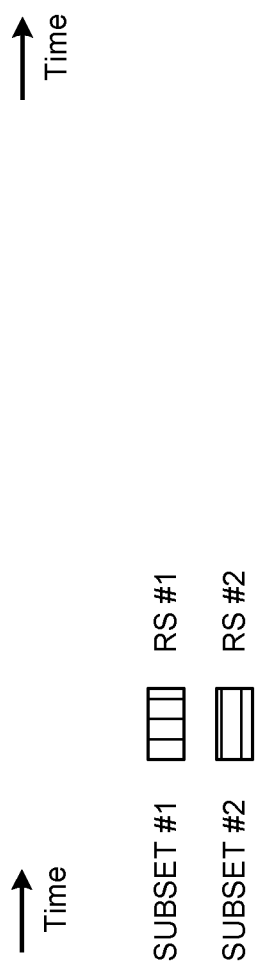
Figure 3A:
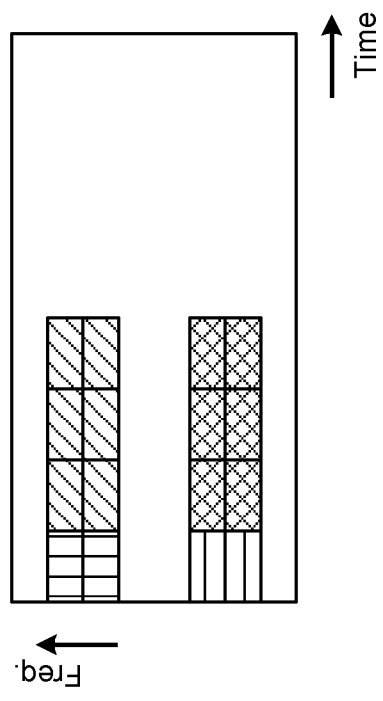
FIGS. 3A to 3D are diagrams illustrating examples of radio resource allocation in a case where different beam forming is performed per PDCCH candidate set.
Figure 3C:
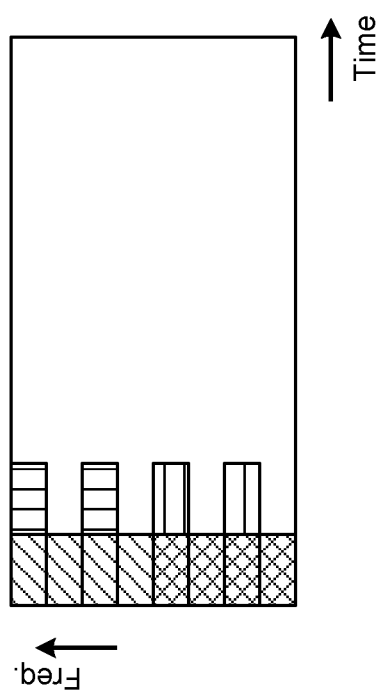
Figure 3B:
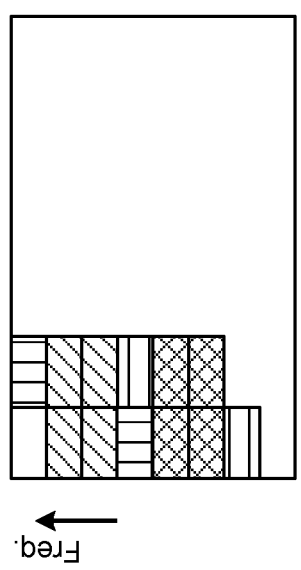
Figure 3D:
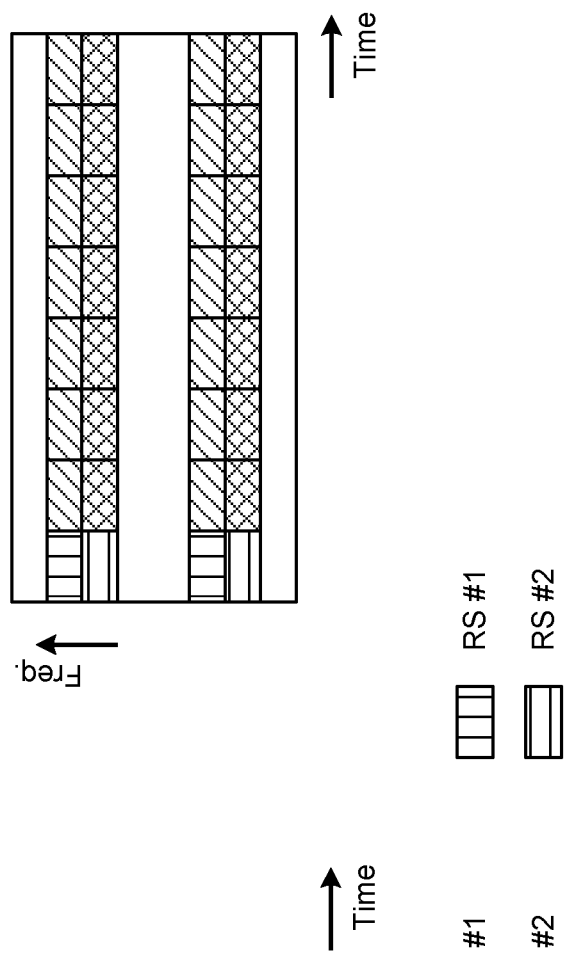

FIG. 2C illustrates an example where a L1/L2 control signal is allocated to be subjected to TDM and FDM with another signal. In this example, RSs are transmitted such that the RSs are neighboring to a corresponding search space subset in a frequency direction.

FIG. 2D illustrates an example where a L1/L2 control signal is allocated to be subjected to FDM with another signal. In this example, RSs are transmitted such that the RSs are neighboring to (precede) a corresponding search space subset in the time direction. As illustrated in FIG. 2D, the L1/L2 control signal may be transmitted in a non-continuous frequency domain. In this regard, the L1/L2 control signal may be transmitted in a non-continuous time domain.

In this regard, FIGS. 2A to 2D illustrate examples where a plurality of L1/L2 control signals is transmitted by using the same time domain and different frequency domains. However, the present invention is not limited to this. For example, a plurality of L1/L2 control signals may be transmitted by using the same frequency domain and different time domains or by using different frequency domains and different time domains.

Further, in the present embodiment, a plurality of different search spaces may be configured. In this case, different beam forming may be configured to be performed per search space. In, for example, FIGS. 2A to 2D, the search space subsets #1 and #2 may be read as search spaces #1 and #2. Further, the UE may demodulate PDCCH candidates included in the same search space by using the same RS, or may demodulate the PDCCH candidates by using different RSs.

[Beam Forming that is Different Per Configured PDCCH Candidate Set]

In a case of above (2), one or more PDCCH candidates and a reference signal used to demodulate the PDCCH candidates are configured to the UE. For example, the eNB may notify the UE of information related to a correspondence between PDCCH candidate indices and configurations of reference signals used for demodulation. In this regard, one or more PDCCH candidates may be referred to as a PDCCH candidate set.

When, for example, one search space includes eight PDCCH candidates, the UE can perform reception processing to demodulate PDCCH candidates #0 to #3 (PDCCH candidate set #1) by using the RS #1, and demodulate PDCCH candidates #4 to #7 (PDCCH candidate set #2) by using the RS #2.

In this regard, the UE may be notified of information related to PDCCH candidates and may receive, for example, information related to radio resources of the PDCCH candidates and information related to the PDCCH candidate set associated with a predetermined reference signal. Further, the UE may be notified of information related to a reference signal used to demodulate the PDCCH candidates or receive, for example, information related to a configuration of a reference signal used for demodulation.

FIGS. 3A to 3D are diagrams illustrating examples of radio resource allocation in a case where different beam forming is performed per PDCCH candidate set. FIGS. 3A to 3D illustrate radio resources to which the two PDCCH candidate sets (PDCCH candidate sets #1 and #2) and the reference signals (RSs #1 and #2) used to demodulate PDCCH candidates in each PDCCH candidate set are allocated. FIGS. 3A to 3D will not be described since search space subsets are read as PDCCH candidate sets as described above with reference to FIGS. 2A to 2D.

In this regard, a plurality of different search spaces may be configured even in a case where different beam forming is applied per PDCCH candidate set.

[Blind Detection by UE]

The UE tries blind detection for each PDCCH candidate in one or more search spaces. When detecting only one scheduling information (a DL assignment or an UL grant) as a result of the blind detection, the UE transmits or receives data based on the detected scheduling information.

Further, in a case where two or more pieces of scheduling information (DL assignments or UL grants) are detected as the result of the blind detection, the UE determines one of these two or more pieces of scheduling information as one valid detection result based on the predetermined conditions, and transmits or receives data based on the valid scheduling information.

The two or more pieces of scheduling information that are determination targets are, for example, scheduling information (DL assignment) for scheduling DL data of the same carrier and scheduling information (UL grant) for scheduling UL data of the same carrier yet are not limited to these. For example, the UE may be configured to select one of the two or more pieces of scheduling information for scheduling data of different carriers.

Figure 4A:
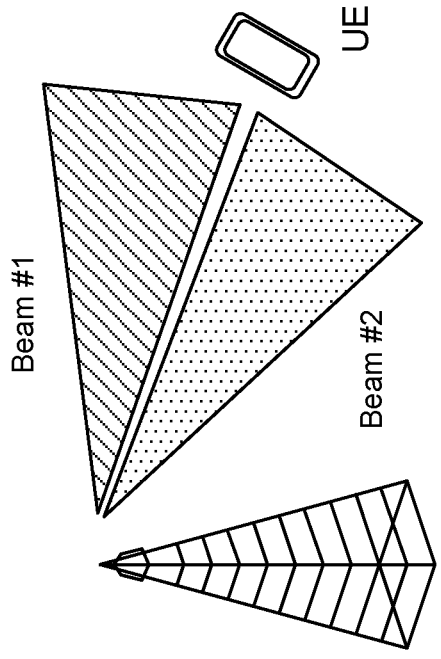
FIGS. 4A and 4B are explanatory diagrams of blind detection in a UE.
Figure 4B:
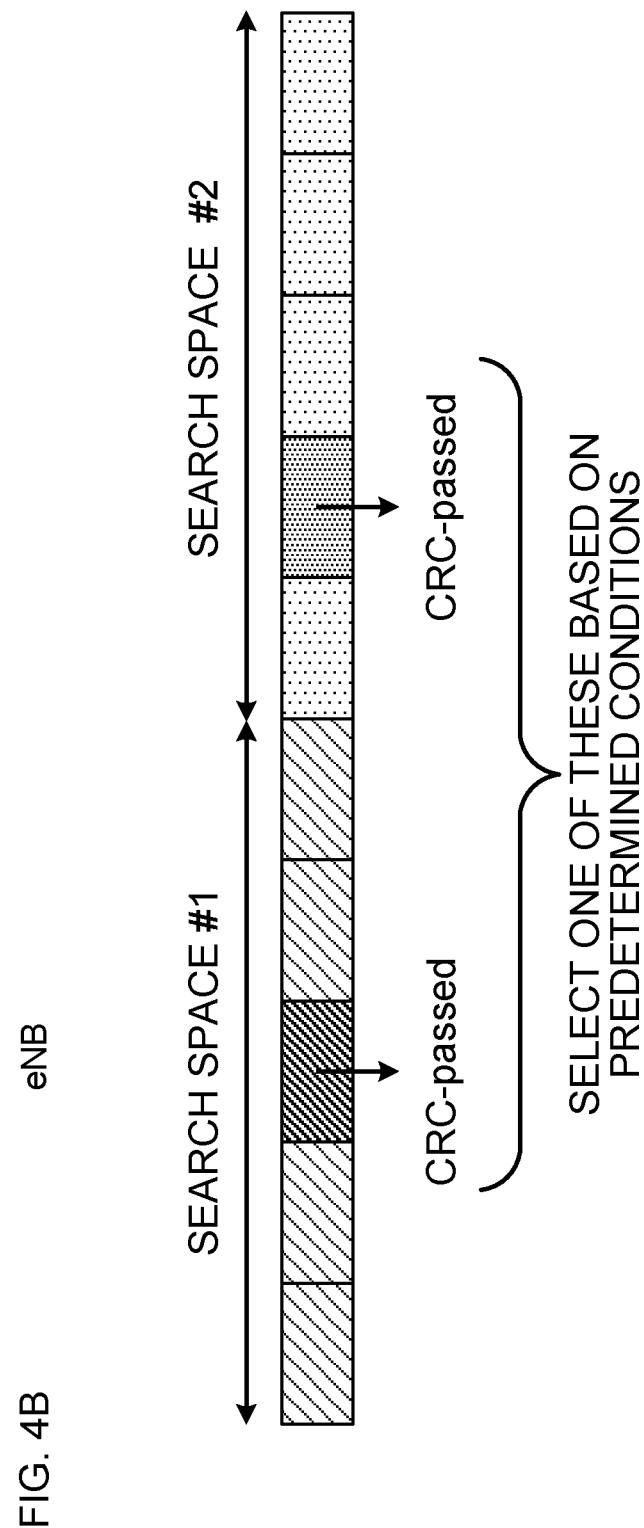

FIGS. 4A and 4B are explanatory diagrams of blind detection of the UE according to one embodiment of the present invention. FIG. 4A illustrates an example where the eNB transmits a plurality of different Beams (Beams #1 and #2) to the UE. FIG. 4B illustrates an example of search spaces (#1 and #2) corresponding to each beam in FIG. 4A.

In this example, as a result of the blind detection (blind decoding) performed by the UE for these search spaces, the UE discovers (detects) scheduling information that passes CRC (Cyclic Redundancy Check) in each search space. In this case, the UE selects one of pieces of scheduling information and transmits or receives data based on the predetermined conditions.

The predetermined conditions for determining valid scheduling information may be, for example, at least one of higher received power (e.g. RSRP (Reference Signal Received Power)), higher received quality (e.g. RSRQ (Reference Signal Received Quality) or a higher Signal to Interference plus Noise Ratio (received SINR)).

Further, the UE may be configured to determine the valid scheduling information based on predetermined information. When, for example, the UE discovers a plurality of pieces of scheduling information in the scheduling information (a DL assignment and/or an UL grant), the UE may include an instruction for instructing which one of a plurality of pieces of scheduling information is adopted as valid information, in one of a plurality of pieces of scheduling information. The UE can determine the valid scheduling information based on the instruction.

For example, the instruction may be indicated by one bit, "0" may indicate that the information including the instruction is de-activated (another scheduling information is activated) when a plurality of pieces of scheduling information is discovered, or "1" may indicate that the information including the instruction is activated (another scheduling information is de-activated) when a plurality of pieces of scheduling information is discovered.

In this regard, the present invention is not limited to this, and the instruction may be expressed by a plurality of bits or may be expressed by a priority (e.g. scheduling information of the highest priority is determined as valid scheduling information) for determining one of a plurality of pieces of scheduling information as valid scheduling information when a plurality of pieces of scheduling information is discovered.

Further, scheduling information that is preferentially regarded as valid scheduling information may be configured in advance. When, for example, detecting a plurality of pieces of scheduling information, the UE may be configured to regard scheduling information detected in a predetermined search space (or a search space subset) as valid scheduling information or may be configured to regard scheduling information detected in a predetermined PDCCH candidate (or a PDCCH candidate set) as valid scheduling information.

Further, the eNB may notify the UE of information for determining valid scheduling information among the two or more pieces of scheduling information. For example, the eNB may notify the information related to the above predetermined conditions or information related to the scheduling information that is preferentially regarded as the valid scheduling information.

According to the above described embodiment, the eNB transmits two or more pieces of scheduling information to the UE for which an appropriate beam cannot be determined, by using a plurality of different beams, and, consequently, can prevent a situation that an inappropriate beam makes it impossible to receive scheduling information. That is, the UE can perform communication as along as the UE can receive at least one of a plurality of control signals to which different beam control is applied and, consequently, improve robustness against beam tracking.

MODIFIED EXAMPLE

[Reference Signal for Data]

According to one embodiment of the present invention, a data channel (data signal) may be received (demodulated) according to a reference signal different from a reference signal used to demodulate a L1/L2 control signal.

For example, DL data received on a downlink data channel (e.g. PDSCH) by the UE may be demodulated by another reference signal (e.g. a reference signal configured to receive the PDSCH) different from the DL assignment for scheduling DL data. The eNB may notify the UE of information related to a configuration of a reference signal (e.g. a radio resource position, a sequence and a reference signal index) used to demodulate DL data.

Figure 5A:
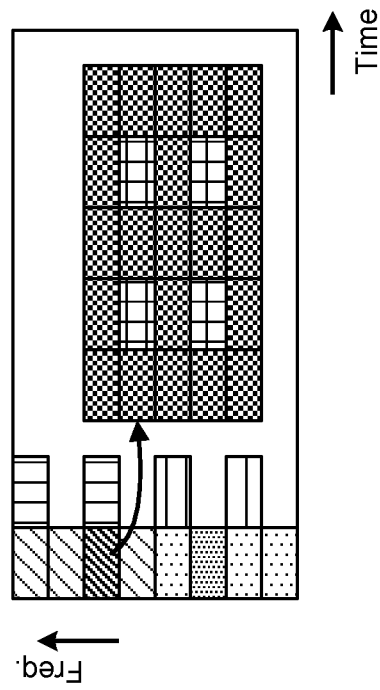
FIGS. 5A to 5C are diagrams illustrating examples in a case where DL data is demodulated by using a reference signal different from a reference signal for a DL assignment.
Figure 5C:
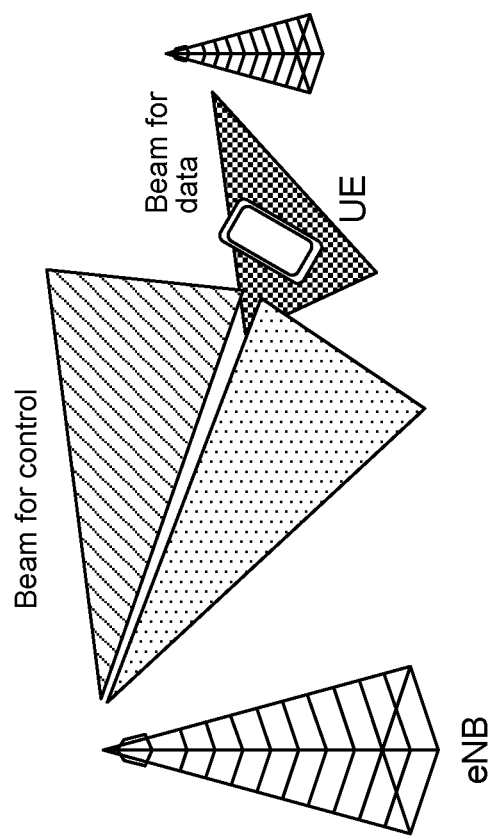
Figure 5B:
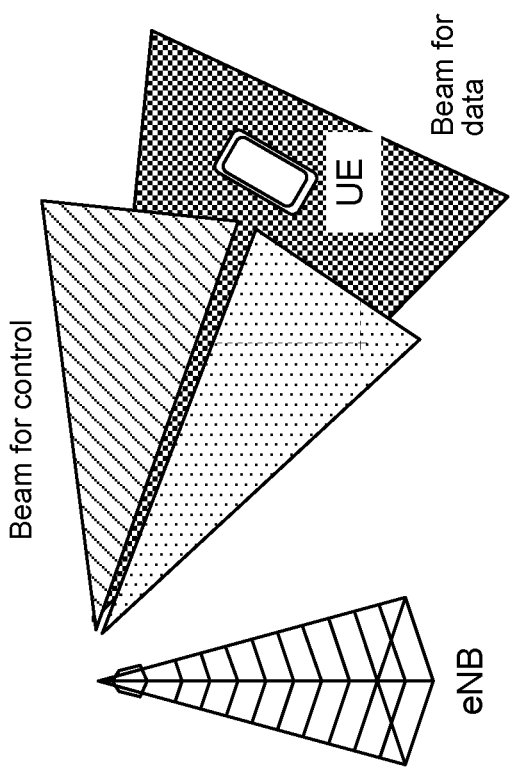

FIGS. 5A to 5C are diagrams illustrating examples in a case where DL data is demodulated by using a reference signal different from a reference signal for a DL assignment. FIG. 5A is a diagram illustrating an example of radio resource allocation. In this example, two search space subsets are configured similar to FIG. 2A, and the UE receives DL data by using a DL assignment transmitted by using the search space subset #1 as the result of the blind detection.

In this regard, a Reference Signal (RS for data) used to demodulate the DL data is a reference signal different from the Reference Signals (RS #1 and #2) used to demodulate scheduling information. Consequently, it is possible to perform different beam control between a control channel and a data channel of different required quality (see FIG. 5B), and apply Coordinated Multi-Point (CoMP) transmission of transmitting the control channel and the data channel from different transmission points (see FIG. 5C).

In this regard, the UE can perform transmission beam control (for example, apply precoding) based on an uplink data channel (e.g. PUSCH) based on an instruction of the UL grant to transmit UL data.

[Beam Reporting]

Preferably, the eNB can recognize which beam (beam control) is suitable for the UE (i.e. the UE has performed transmission/reception based on scheduling information indicating which beam control has been performed) when transmitting a plurality of pieces of scheduling information by using different beams.

Hence, the UE may report the information related to a suitable beam to the eNB by higher layer signaling (e.g. RRC signaling), physical layer signaling (e.g. uplink L1/L2 control information (UCI: Uplink Control Information)) or a combination of these. The eNB can make beam control appropriate based on the reported information.

The information related to the suitable beam may be referred to as, for example, beam specifying information. The beam specifying information may be a beam index (beam control number) for specifying a beam. For example, the scheduling information transmitted by the eNB may include information (e.g. beam index) related to a beam used to transmit this scheduling information. In this case, the UE can report to the eNB the beam index included in the scheduling information discovered by blind detection (determined as valid scheduling information according to the above method).

More specifically, when receiving DL data (e.g. PDSCH) based on a DL assignment, the UE may include at least one of the selected beam index, a reference signal index and a search space index (search space subset index) as beam specifying information in a HARQ-ACK feedback for the DL data, and transmit the beam specifying information.

When transmitting UL data based on an UL grant, the UE may transmit the beam specifying information described in relation to the HARQ-ACK feedback as the UL data. Further, the UE may include in the UL data the beam specifying information and, in addition, a received quality measurement result of a reference signal corresponding to the UL grant used for demodulation or a received quality measurement result of a reference signal corresponding to the UL grant, and report the UL data.

In this regard, in either case, the UE may report the beam specifying information related to the selected beam and, in addition, beam specifying information related to a beam that can be actually demodulated (that can be successfully demodulated). In this case, the UE can report a plurality of pieces of beam specifying information, and the eNB can recognize a plurality of beams (controlled beams) that the UE can demodulate.

Further, when beam control is applied to a plurality of DL assignments, beam specifying information may employ a configuration of a control channel (e.g. radio resources, a sequence, a modulation scheme, a coding scheme and a hopping pattern) for transmitting HARQ-ACK for DL data scheduled by a DL assignment. The eNB can grasp which beam control is performed on a DL assignment received (detected) by the UE, according to a control channel configuration used to transmit HARQ-ACK by the UE.

In this regard, when beam specifying information is associated with a control channel in this way, it is necessary to reserve for the UE a plurality of radio resources and sequences of a control channel for transmitting HARQ-ACK. The eNB performs control not to allocate the radio resources and the sequences of the reserved control channel to another UE.

Figure 6A:
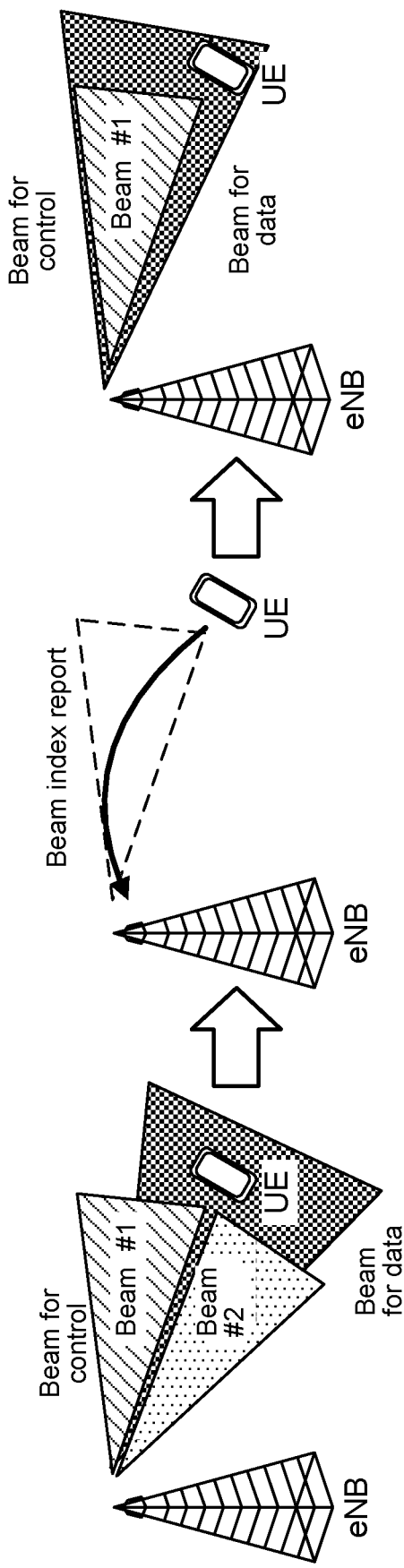
FIGS. 6A and 6B are diagrams illustrating examples of beam control in a case where a beam report from the UE is used.
Figure 6B:
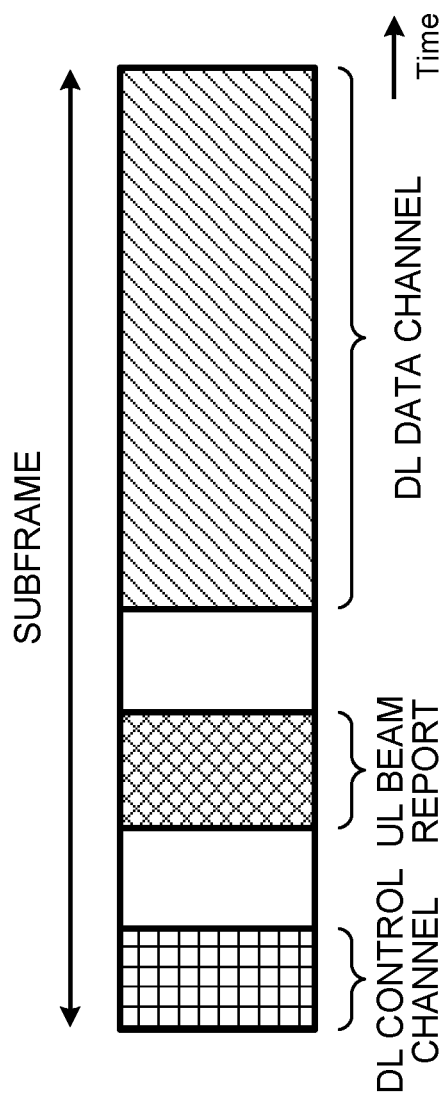

FIGS. 6A and 6B are diagram illustrating examples of beam control in a case where a beam report from the UE is used. In FIG. 6A, the eNB transmits a control signal by using a plurality of different beams (Beams for control (Beams #1 and #2)) for the UE, and transmits (or receives) a data signal by using a beam (Beam for data) different from these beams.

The UE determines that a beam #1 is more suitable than a beam #2, and receives (or transmits) a data signal based on scheduling information transmitted by using the beam #1. In this case, the UE reports, to the eNB, beam specifying information (e.g. beam index) for specifying the beam #1 that has been determined as the suitable beam.

When grasping that the beam #1 is suitable for the UE based on the reported information, the eNB can form a beam used for a data signal toward the same or similar direction as or to that of the beam #1. Consequently, it is possible to suitably transmit and receive data.

Further, the eNB can increase or decrease the number of beams for transmitting scheduling information (control signal) related to the same carrier based on the reported information. For example, the eNB can perform control to transmit the control signal by using only the beam #1 (not to generate the beam #2). Consequently, the eNB can transmit a data signal instead of, for example, the control signal and, consequently, suppress a decrease in frequency use efficiency. In this regard, the eNB may increase the number of beams for transmitting a control signal to a predetermined UE.

In this regard, a series of processing described above in relation to FIG. 6A can be controlled to be performed in a predetermined period (e.g. one subframe). That is, it is possible to make beam control for a data channel included in the same subframe appropriate based on report information related to beam control applied to a control channel of a given subframe. FIG. 6B illustrates an example of radio resource allocation of a signal transmitted and received from one subframe when beam control that uses a beam report illustrated in FIG. 6A is performed by using the one subframe.

Scheduling information is transmitted by using a plurality of different beams in a period to which a "DL control channel" is allocated in this subframe. Subsequently, the UE transmits beam specifying information associated with the selected scheduling information in a period to which an "UL beam report" is allocated. Further, the eNB performs beam control and transmits a data signal based on feedback information (beam specifying information) from the UE in the period to which the "DL data channel" is allocated. In this regard, a name of each period is not limited to an example in FIG. 6B.

A subframe for switching DL/UL transmission/reception in a subframe illustrated in FIG. 6B may be realized by a self-contained subframe that has been studied for a radio communication system (e.g. 5G) according to LTE Rel.13 and subsequent versions, for example. Unlike an existing subframe, the self-contained subframe is a subframe including all of an allocation channel for transmitting control information, a data channel for allocating (scheduling) the allocation channel and a feedback channel for giving a feedback based on reception of the data channel.

In this regard, more generally speaking, the self-contained subframe may be included in a symbol or a subframe in which the above three channels continue. More specifically, the self-contained subframe is interpreted as a configuration where another data channel, an allocation channel for allocating the another data channel and/or a feedback channel associated with the another data channel are not temporally sandwiched between time zones of the above three channels, and does not lose generality.

[Other Configuration]

Physical resource block allocation information, a modulation M-ary value and the number of MIMO layer multiplexing of DL data scheduled by a plurality of DL assignments (or UL data scheduled by a plurality of UL grants) may be the same or may be different.

When at least one of these pieces of information are different, the eNB can grasp beam control applied to reception of a L1/L2 control signal in the UE based on HARQ-ACK or resource allocation information of the UL data transmitted by the UE.

Further, when transmission power for transmitting HARQ-ACK or the UL data from the UE runs short (power is limited) (or when a required code rate cannot be achieved), the UE may drop (may not transmit) beam specifying information related to a beam used to receive the L1/L2 control signal.

In this regard, the above embodiment employs a configuration of applying different beam control to a plurality of L1/L2 control signals for scheduling transmission/reception of data of the same carrier for a predetermined UE. However, the above radio communication method may be applied to signals other than the L1/L2 control signal. For example, different beam control may be applied to data signals of the same carrier for the predetermined UE or different beam control can also be applied to downlink synchronization signals, Channel State Information (CSI) measurement signals, multicast channels, and the like.

(Radio Communication System)

A configuration of a radio communication system according to one embodiment of the present invention will be described below. The radio communication method according to the above embodiment of the present invention is applied to this radio communication system alone or in combination.

Figure 7:
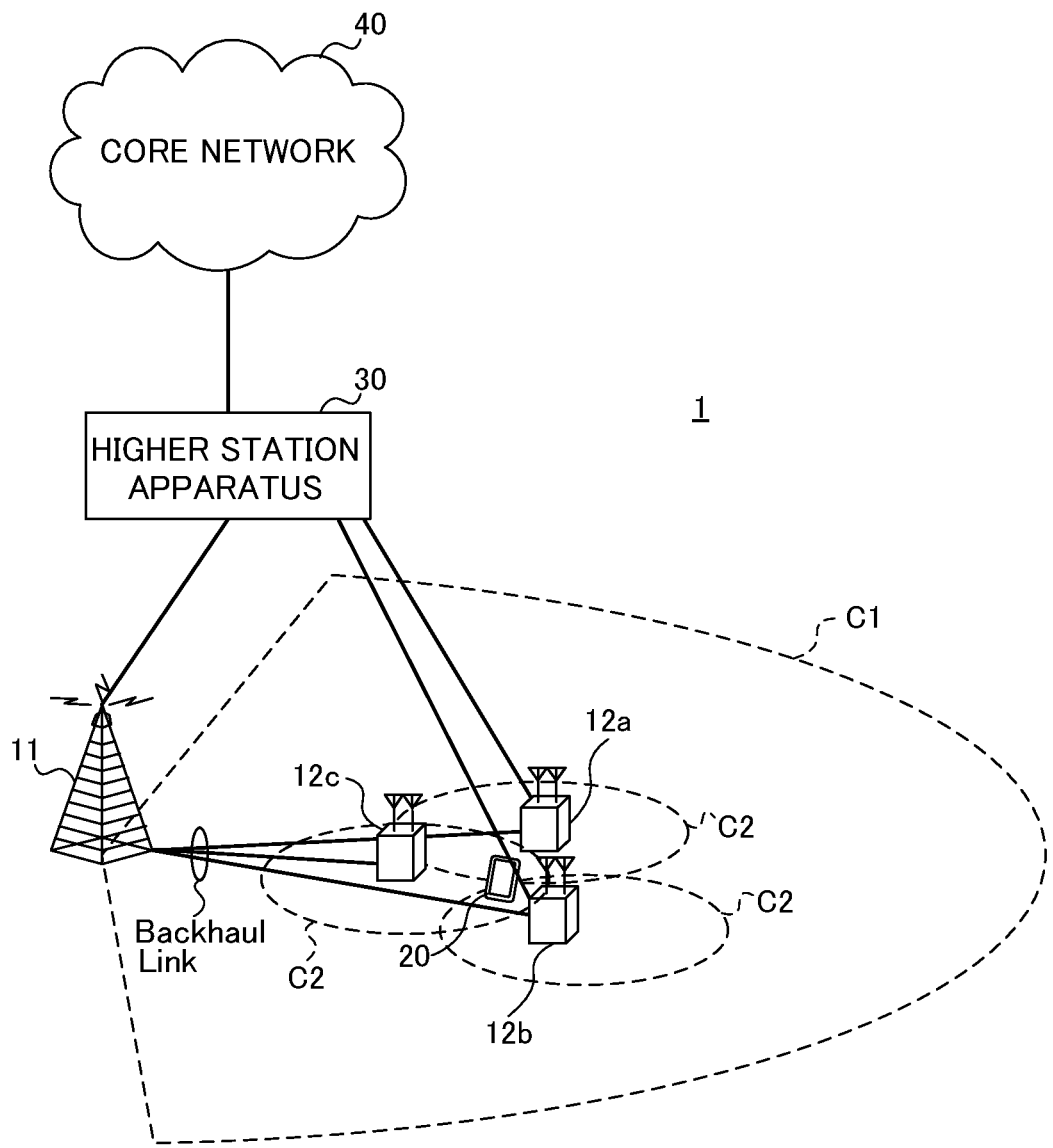
FIG. 7 is a diagram illustrating an example of a schematic configuration of a radio communication system according to one embodiment of the present invention.

FIG. 7 is a diagram illustrating an example of a schematic configuration of the radio communication system according to one embodiment of the present invention. In a radio communication system 1, it is possible to apply Carrier Aggregation (CA) to aggregate a plurality of base frequency blocks (component carriers) whose one unit is a system bandwidth (e.g. 20 MHz) of an LTE system, and/or Dual Connectivity (DC).

In this regard, the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access) and New-RAT (Radio Access Technology), or a system that realizes these.

The radio communication system 1 illustrated in FIG. 7 includes a radio base station 11 that forms a macro cell C1 of relatively wide coverage, and radio base stations 12 (12a to 12c) that are located in the macro cell C1 and form small cells C2 narrower than the macro cell C1. Further, a user terminal 20 is located in the macro cell C1 and each small cell C2.

The user terminal 20 can connect to both of the radio base station 11 and the radio base stations 12. The user terminal 20 is assumed to concurrently use the macro cell C1 and the small cells C2 according to CA or DC. Further, the user terminal 20 can apply CA or DC by using a plurality of cells (CCs) (e.g. five or less CCs or six or more CCs).

The user terminal 20 and the radio base station 11 can communicate by using a carrier (an existing carrier that is called Legacy carrier) of a narrow bandwidth in a relatively low frequency band (e.g. 2 GHz). Meanwhile, the user terminal 20 and each radio base station 12 may use a carrier of a wide bandwidth in a relatively high frequency band (e.g. 3.5 GHz or 5 GHz) or may use the same carrier as that used by the radio base station 11. In this regard, a configuration of a frequency band used by each radio base station is not limited to this.

The radio base station 11 and each radio base station 12 (or the two radio base stations 12) can be configured to be connected by wires (e.g. optical fibers compliant with a CPRI (Common Public Radio Interface) or an X2 interface) or by radio.

The radio base station 11 and each radio base station 12 are connected to a higher station apparatus 30 and are connected to a core network 40 via the higher station apparatus 30. In this regard, the higher station apparatus 30 includes, for example, an access gateway apparatus, a Radio Network Controller (RNC), a Mobility Management Entity (MME) and the like, yet is not limited thereto. Further, each radio base station 12 may be connected to the higher station apparatus 30 via the radio base station 11.

In this regard, the radio base station 11 is a radio base station having relatively wide coverage, and may be referred to as a macro base station, an aggregate node, an eNB (eNodeB) and a transmission/reception point. Further, each radio base station 12 is a radio base station having local coverage, and may be referred to as a small base station, a micro base station, a pico base station, a femto base station, a HeNB (Home eNodeB), a RRH (Remote Radio Head) and a transmission/reception point. The radio base stations 11 and 12 will be collectively referred to as the radio base station 10 unless distinguished below.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme of dividing a frequency band into a plurality of narrow frequency bands (subcarriers), mapping data on each subcarrier and performing communication. SC-FDMA is a single carrier transmission scheme of dividing a system bandwidth into a band comprised of one or continuous resource blocks per terminal, using different bands for a plurality of terminals and reducing an interference between terminals. In this regard, uplink and downlink radio access schemes are not limited to a combination of these and may be another radio access scheme.

The radio communication system 1 uses a downlink shared channel (PDSCH: Physical Downlink Shared Channel), a broadcast channel (PBCH: Physical Broadcast Channel), and a downlink L1/L2 control channel shared by each user terminal 20 as downlink channels. User data, higher layer control information and a SIB (System Information Block) are transmitted on the PDSCH. Further, a MIB (Master Information Block) is transmitted on the PBCH.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of HARQ (Hybrid Automatic Repeat reQuest) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel), an uplink control channel (PUCCH: Physical Uplink Control Channel), and a random access channel (PRACH: Physical Random Access Channel) shared by each user terminal 20 as uplink channels. User data and higher layer control information are transmitted on the PUSCH. Further, downlink radio quality information (CQI: Channel Quality Indicator) and transmission acknowledgement information are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Further, the radio communication system 1 transmits a measurement reference signal (SRS: Sounding Reference Signal) and a DeModulation Reference Signal (DMRS) as uplink reference signals. In this regard, the DMRS may be referred to as a user terminal specific reference signal (UE-specific Reference Signal). Further, a reference signal to be transmitted is not limited to these.

(Radio Base Station)

Figure 8:
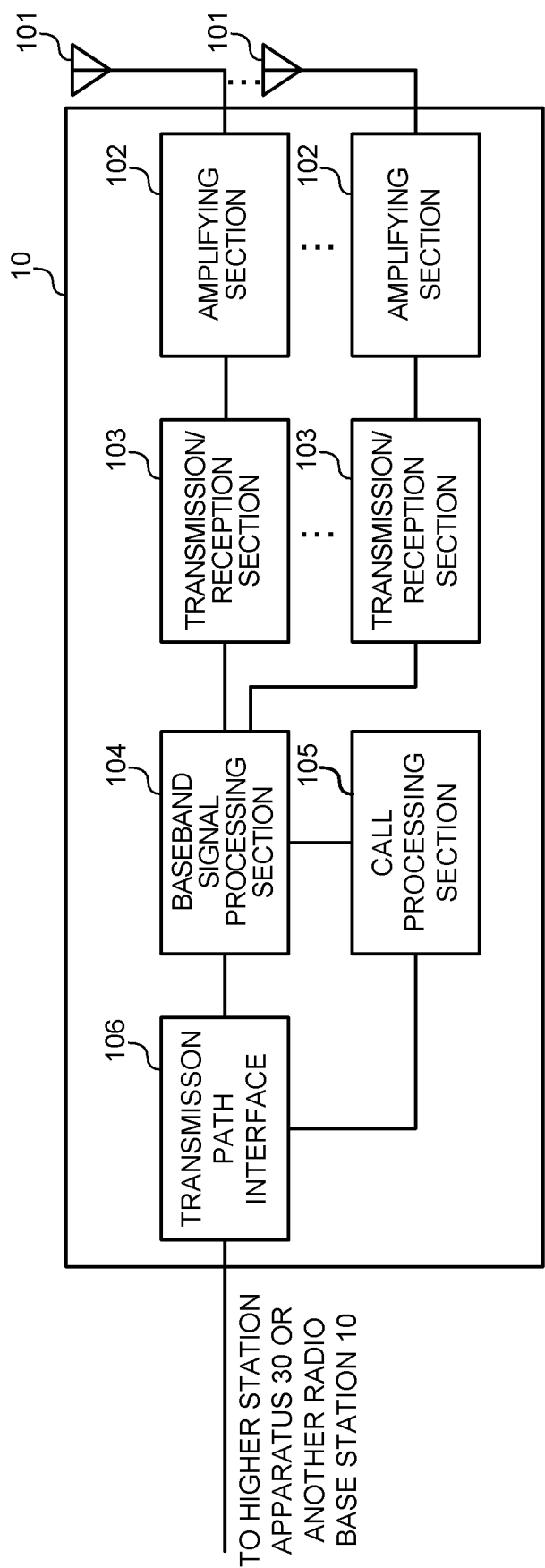
FIG. 8 is a diagram illustrating an example of an entire configuration of a radio base station according to one embodiment of the present invention.

FIG. 8 is a diagram illustrating an example of an entire configuration of the radio base station according to one embodiment of the present invention. The radio base station 10 includes a plurality of transmission/reception antennas 101, amplifying sections 102, transmission/reception sections 103, a baseband signal processing section 104, a call processing section 105, and a transmission path interface 106. In this regard, the radio base station 10 needs to be configured to include one or more transmission/reception antennas 101, amplifying sections 102 and transmission/reception sections 103.

User data transmitted from the radio base station 10 to the user terminal 20 on downlink is input from the higher station apparatus 30 to the baseband signal processing section 104 via the transmission path interface 106.

The baseband signal processing section 104 performs processing of a PDCP (Packet Data Convergence Protocol) layer, segmentation and concatenation of the user data, transmission processing of a RLC (Radio Link Control) layer such as RLC retransmission control, and MAC (Medium Access Control) retransmission control (such as HARQ transmission processing), and transmission processing such as scheduling, transmission format selection, channel coding, Inverse Fast Fourier Transform (IFFT) processing, and precoding processing on the user data to transfer to each transmission/reception section 103. Further, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from the baseband signal processing section 104, into a signal of a radio frequency band. Each amplifying section 102 amplifies the radio frequency signal subjected to frequency conversion by each transmission/reception section 103, and transmits the radio frequency signal from the transmission/reception antennas 101. The transmission/reception sections 103 can be composed of a transmitter/receiver, a transmission/reception circuit or a transmission/reception apparatus described based on a common knowledge in a technical field of the present invention. In this regard, the transmission/reception sections 103 may be composed of an integrated transmission/reception section or may be composed of a transmission section and a reception section.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of a RLC layer and a PDCP layer on user data included in the input uplink signal to transfer to the higher station apparatus 30 via the transmission path interface 106. The call processing section 105 performs call processing such as configuration and release of a communication channel, state management of the radio base station 10, and management of radio resources.

The transmission path interface 106 transmits and receives signals to and from the higher station apparatus 30 via a predetermined interface. Further, the transmission path interface 106 may transmit and receive (backhaul signaling) signals to and from another radio base station 10 via an inter-base station interface (e.g. optical fibers compliant with the CPRI (Common Public Radio Interface) or the X2 interface).

In this regard, each transmission/reception section 103 can transmit a plurality of pieces of downlink control information (DL assignments or UL grants) related to scheduling of data of the same carrier, to the user terminal 20 by using different beams. Further, each transmission/reception section 103 can transmit a plurality of different reference signals used to receive (demodulate) each downlink control information.

Furthermore, each transmission/reception section 103 may transmit, to the user terminal 20, information related to a correspondence between search space subset indices (or PDCCH candidate indices) and configurations of reference signals used for demodulation, information related to a search space subset or information related to a reference signal used to demodulate a PDCCH candidate.

Each transmission/reception section 103 transmits downlink data on a downlink shared channel (e.g. PDCCH) to the user terminal 20. In this regard, each transmission/reception section 103 receives uplink data on an uplink shared channel (e.g. PUSCH) from the user terminal 20. Each transmission/reception section 103 may receive HARQ-ACK for downlink data transmitted on the downlink shared channel (PDSCH).

Further, each transmission/reception section 103 may receive beam specifying information of a beam corresponding to scheduling information used to transmit/receive data by the user terminal 20. Furthermore, each transmission/reception section 103 may transmit data to the user terminal 20 by using a beam controlled by a control section 301 based on the beam specifying information.

Figure 9:
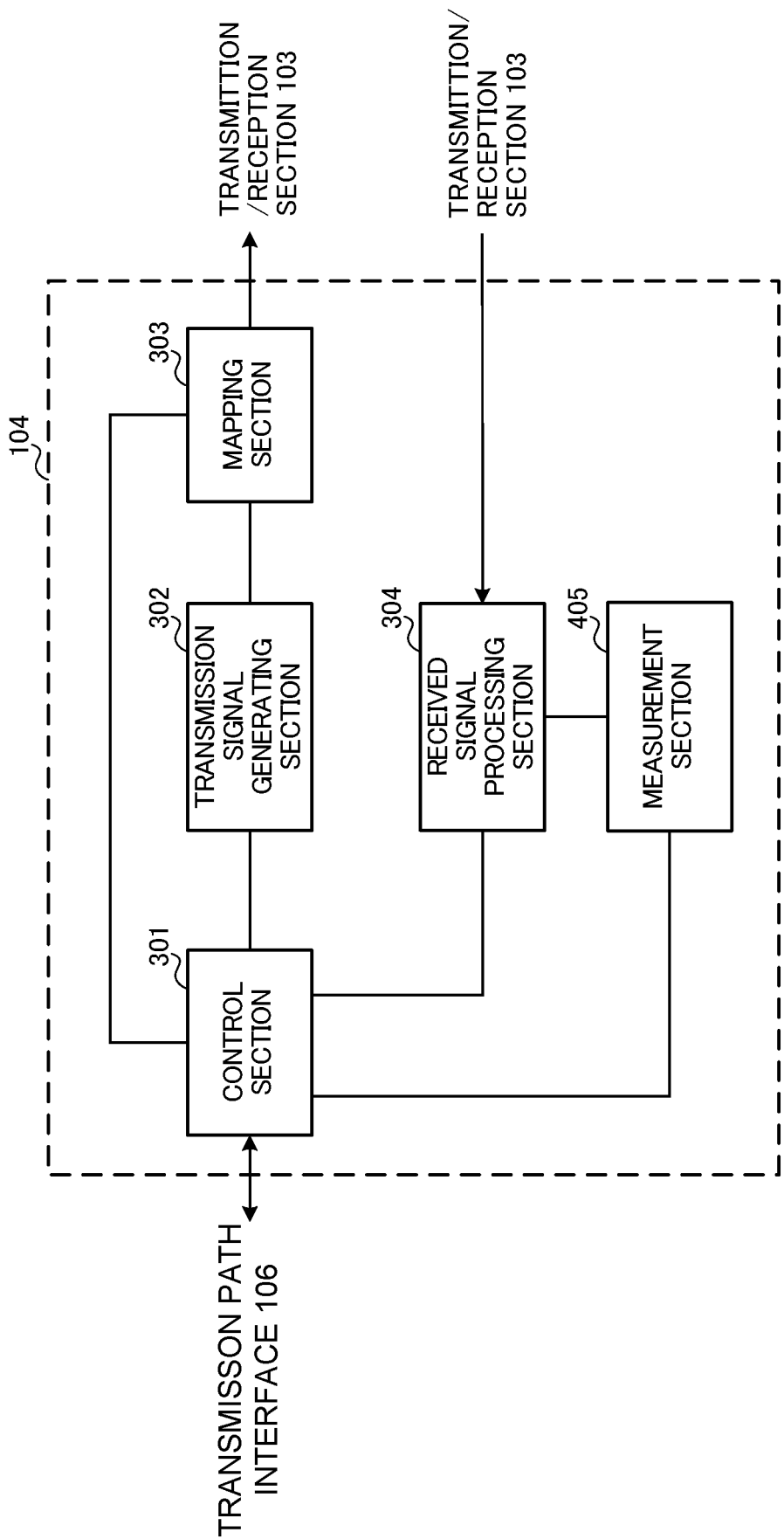
FIG. 9 is a diagram illustrating an example of a function configuration of the radio base station according to one embodiment of the present invention.

FIG. 9 is a diagram illustrating an example of a function configuration of the radio base station according to one embodiment of the present invention. In addition, FIG. 9 mainly illustrates function blocks of characteristic portions in the present embodiment, and it is assumed that the radio base station 10 has other function blocks required for radio communication, too. As shown in FIG. 9, the baseband signal processing section 104 includes at least the control section (scheduler) 301, a transmission signal generating section 302, a mapping section 303, a received signal processing section 304, and a measurement section 305.

The control section (scheduler) 301 controls the entire radio base station 10. The control section 301 can be composed of a controller, a control circuit and a control apparatus described based on the common knowledge in the technical field according to the present invention.

The control section 301 controls, for example, generation of signals in the transmission signal generating section 302 and allocation of signals in the mapping section 303. Further, the control section 301 controls reception processing of signals in the received signal processing section 304 and signal measurement in the measurement section 305.

The control section 301 controls scheduling (e.g. resource allocation) of system information, a downlink data signal transmitted on the PDSCH, and a downlink control signal transmitted on the PDCCH and/or the EPDCCH. Further, the control section 301 controls generation of a downlink control signal (e.g. transmission acknowledgement information) or a downlink data signal based on a result obtained by determining whether or not it is necessary to perform retransmission control on an uplink data signal. Furthermore, the control section 301 controls scheduling of synchronization signals (e.g. a PSS (Primary Synchronization Signal)/a SSS (Secondary Synchronization Signal)) and downlink reference signals such as a CRS, a CSI-RS and a DMRS.

Still further, the control section 301 controls scheduling of an uplink data signal transmitted on the PUSCH, an uplink control signal (e.g. transmission acknowledgement information) transmitted on the PUCCH and/or the PUSCH, a random access preamble transmitted on the PRACH and an uplink reference signal.

More specifically, the control section 301 performs control to transmit a plurality of pieces of downlink control information related to scheduling of data of the same carrier by using different beams. Further, the control section 301 performs control to transmit or receive data corresponding to these pieces of downlink control information by using a predetermined beam. Furthermore, the control section 301 performs control to transmit different reference signals associated with these pieces of downlink control information, respectively.

Still further, the control section 301 may perform control to include predetermined information (an instruction (valid instruction information) for instructing which one of a plurality of pieces of scheduling information is adopted as valid information) in at least one of a plurality of pieces of downlink control information to transmit.

Moreover, the control section 301 performs control to generate a reference signal different from a reference signal used to demodulate the downlink control information as a reference signal for data scheduled based on the downlink control information, and transmit the reference signal.

Further, when receiving beam specifying information for specifying a beam corresponding to the downlink control information selected by the user terminal 20 from the received signal processing section 304, the control section 301 may perform control to determine a beam used to transmit data based on the beam specifying information.

Furthermore, the control section 301 may perform control to generate various pieces of information related to beam control or demodulation and notify the user terminal 20 by using higher layer signaling (e.g. RRC signaling, broadcast information (a MIB and a SIB)), downlink control information (DCI) or a combination of these.

The transmission signal generating section 302 generates downlink signals (such as a downlink control signal, a downlink data signal and a downlink reference signal) based on an instruction from the control section 301 to output to the mapping section 303. The transmission signal generating section 302 can be composed of a signal generator, a signal generation circuit and a signal generating apparatus described based on the common knowledge in the technical field according to the present invention.

The transmission signal generating section 302 generates, for example, a DL assignment for notifying allocation information of a downlink signal, and an UL grant for notifying allocation information of an uplink signal based on the instruction from the control section 301. Further, the transmission signal generating section 302 performs encoding processing and modulation processing on a downlink data signal according to a code rate and a modulating scheme determined based on Channel State Information (CSI) and the like from each user terminal 20.

The mapping section 303 maps the downlink signal generated by the transmission signal generating section 302, on predetermined radio resources based on the instruction from the control section 301, and outputs the downlink signal to the transmission/reception section 103. The mapping section 303 can be composed of a mapper, a mapping circuit or a mapping apparatus described based on the common knowledge in the technical field according to the present invention.

The received signal processing section 304 performs reception processing (e.g. demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs HARQ-ACK to the control section 301. Further, the received signal processing section 304 outputs a received signal and a signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g. RSRP (Reference Signal Received Power)), received quality (e.g. RSRQ (Reference Signal Received Quality)), a SINR (Signal to Interference plus Noise Ratio)) or a channel state of the received signal. The measurement section 305 may output a measurement result to the control section 301.

(User Terminal)

Figure 10:
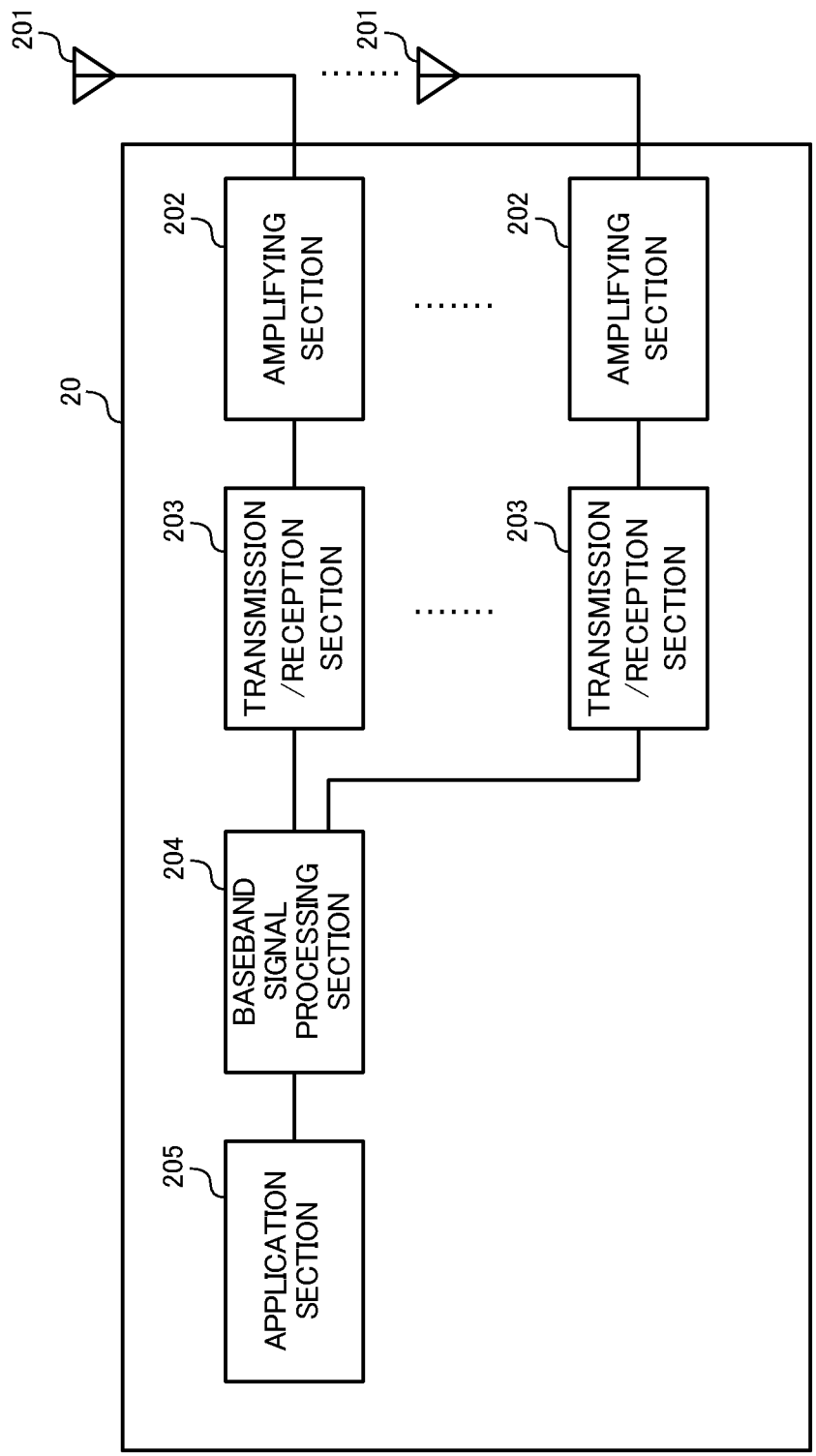
FIG. 10 is a diagram illustrating an example of an entire configuration of a user terminal according to one embodiment of the present invention.

FIG. 10 is a diagram illustrating an example of an entire configuration of the user terminal according to one embodiment of the present invention. The user terminal 20 includes a plurality of transmission/reception antennas 201, amplifying sections 202, transmission/reception sections 203, a baseband signal processing section 204, and an application section 205. In this regard, the user terminal 20 needs to be configured to include one or more transmission/reception antennas 201, amplifying sections 202 and transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of a transmitter/receiver, a transmission/reception circuit or a transmission/reception apparatus described based on the common knowledge in the technical field according to the present invention. In this regard, the transmission/reception sections 203 may be composed of an integrated transmission/reception section or may be composed of a transmission section and a reception section.

The baseband signal processing section 204 performs FFT processing, error correcting decoding, reception processing of retransmission control and the like on the input baseband signal. The baseband signal processing section 204 transfers downlink user data to the application section 205. The application section 205 performs processing related to layers higher than a physical layer and a MAC layer. Further, the baseband signal processing section 204 transfers broadcast information among the downlink data, too, to the application section 205.

Meanwhile, the application section 205 inputs uplink user data to the baseband signal processing section 204. The baseband signal processing section 204 performs transmission processing of retransmission control (e.g. HARQ transmission processing), channel coding, precoding, Discrete Fourier Transform (DFT) processing, IFFT processing and the like on the uplink user data to transfer to each transmission/reception section 203. Each transmission/reception section 203 converts the baseband signal output from the baseband signal processing section 204 into a signal of a radio frequency band to transmit. Each amplifying section 202 amplifies the radio frequency signal subjected to the frequency conversion by each transmission/reception section 203 to transmit from each transmission/reception antenna 201.

In this regard, each transmission/reception section 203 can receive a plurality of pieces of downlink control information (DL assignments and UL grants) related to scheduling of data of the same carrier by using different beams. Further, each transmission/reception section 203 can receive a plurality of different reference signals used to receive (demodulate) each downlink control information.

Furthermore, each transmission/reception section 203 may receive information related to the correspondence between search space subset indices (or PDCCH candidate indices) and configurations of reference signals used for demodulation, information related to search space subsets and information related to reference signals used to demodulate PDCCH candidates from the radio base station 10.

Each transmission/reception section 203 receives downlink data on the downlink shared channel (e.g. PDSCH) based on the DL assignment from the radio base station 10. In this regard, each transmission/reception section 203 transmits uplink data on the uplink shared channel (e.g. PUSCH) based on an UL grant to the radio base station 10. Each transmission/reception section 203 may transmit HARQ-ACK to downlink data transmitted on the downlink shared channel (PDSCH).

Further, each transmission/reception section 203 may transmit to the radio base station 10 beam specifying information of a beam corresponding to scheduling information selected by a control section 401. Furthermore, each transmission/reception section 203 may receive from the radio base station 10 data transmitted by using a beam controlled based on the beam specifying information.

Figure 11:
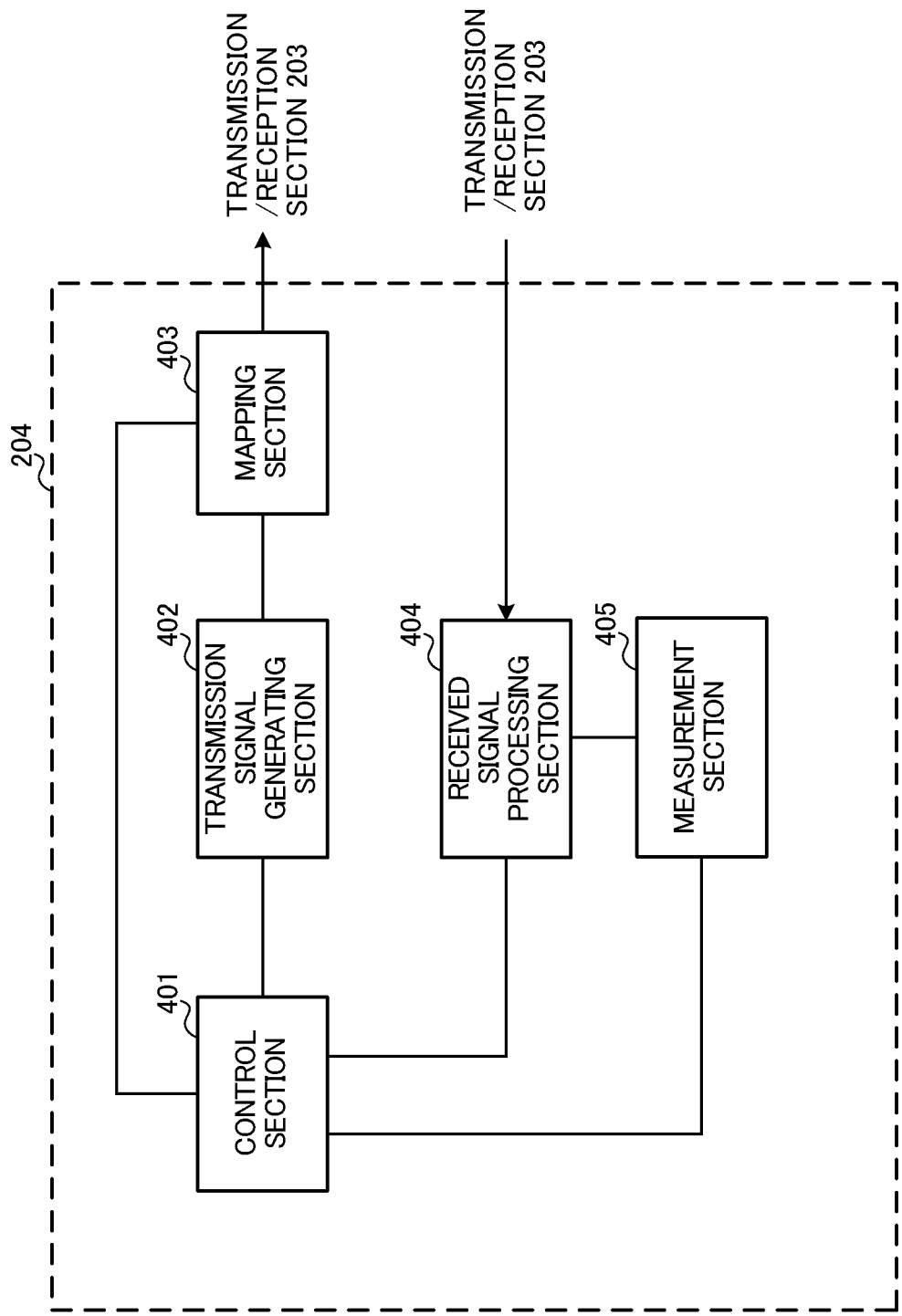
FIG. 11 is a diagram illustrating an example of a function configuration of the user terminal according to one embodiment of the present invention.

FIG. 11 is a diagram illustrating an example of a function configuration of the user terminal according to one embodiment of the present invention. In addition, FIG. 11 mainly illustrates function blocks of characteristic portions in the present embodiment, and it is assumed that the user terminal 20 has other function blocks required for radio communication, too. As shown in FIG. 11, the baseband signal processing section 204 of the user terminal 20 includes the control section 401, a transmission signal generating section 402, a mapping section 403, a received signal processing section 404, and a measurement section 405.

The control section 401 controls the entire user terminal 20. The control section 401 can be composed of a controller, a control circuit or a control apparatus described based on the common knowledge in the technical field according to the present invention.

The control section 401 controls, for example, generation of signals in the transmission signal generating section 402 and allocation of signals in the mapping section 403. Further, the control section 401 controls reception processing of signals in the received signal processing section 404 and signal measurement in the measurement section 405.

The control section 401 obtains downlink control signals (signals transmitted on the PDCCH/EPDCCH) and a downlink data signal (a signal transmitted on the PDSCH) transmitted from the radio base station 10, from the received signal processing section 404. The control section 401 controls generation of an uplink control signal (e.g. transmission acknowledgement information) and an uplink data signal based on a result obtained by determining whether or not it is necessary to perform retransmission control on the downlink control signal and the downlink data signal.

More specifically, the control section 401 performs control to receive a plurality of pieces of downlink control information related to scheduling of data of the same carrier, select at least one of these pieces of downlink control information and transmit or receive data based on the selected downlink control information. The control section 401 performs control to demodulate these pieces of downlink control information based on different reference signals, respectively.

For example, these pieces of downlink control information are detected in a search space of downlink control channel candidates (e.g. PDCCH candidates). When the search space is configured to be divided into a plurality of subsets, one downlink control information may be detected per subset. Further, when all downlink control channel candidates are divided into a plurality of downlink control channel candidate sets, one downlink control information may be detected per downlink control channel candidate set. Furthermore, the control section 401 performs control to demodulate each downlink control channel by using the associated reference signal.

When detecting a plurality of pieces of downlink control information, the control section 401 may perform control to use one of the pieces of downlink control information for data transmission/reception based on each downlink control information and/or at least one of RSRP, RSRQ and a received SINR of reference signals associated with each downlink control information. In this regard, the control section 401 receives an input of a measurement result of the RSRP from the measurement section 405.

Further, the control section 401 may perform control to use one of the pieces of downlink control information for data transmission/reception based on predetermined information (an instruction (valid instruction information) for instructing which one of a plurality of pieces of scheduling information is adopted as valid information) included in at least one of a plurality of pieces of downlink control information when detecting a plurality of pieces of downlink control information.

Furthermore, the control section 401 may perform control to receive data based on downlink control information based on a reference signal different from a reference signal used to demodulate the downlink control information selected to transmit/receive the data.

Still further, the control section 401 may perform control to transmit to the radio base station 10 beam specifying information for specifying a beam corresponding to the selected downlink control information.

Moreover, when obtaining various pieces of information notified from the radio base station 10 from the received signal processing section 404, the control section 401 may update parameters used to perform control based on the information.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generation circuit and a signal generating apparatus described based on the common knowledge in the technical field according to the present invention.

For example, the transmission signal generating section 402 generates an uplink control signal related to transmission acknowledgement information and Channel State Information (CSI) based on, for example, the instruction from the control section 401. Further, the transmission signal generating section 402 generates an uplink data signal based on the instruction from the control section 401. When, for example, the downlink control signal notified from the radio base station 10 includes an UL grant, the control section 401 instructs the transmission signal generating section 402 to generate an uplink data signal.

The mapping section 403 maps the uplink signal generated by the transmission signal generating section 402, on radio resources based on the instruction from the control section 401, and outputs the uplink signal to the transmission/reception section 203. The mapping section 403 can be composed of a mapper, a mapping circuit or a mapping apparatus described based on the common knowledge in the technical field according to the present invention.

The received signal processing section 404 performs reception processing (e.g. demapping, demodulation and decoding) on the received signal input from each transmission/reception section 203. In this regard, the received signal is, for example, a downlink signal (such as a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Further, the received signal processing section 404 can configure the reception section according to the present invention.

The received signal processing section 404 performs blind decoding on DCI (DCI format) for scheduling transmission and/or reception of data (TB: Transport Block) based on an instruction of the control section 401.

The received signal processing section 404 outputs information decoded by the reception processing to the control section 401. The received signal processing section 404 outputs, for example, broadcast information, system information, RRC signaling and a DCI to the control section 401. Further, the received signal processing section 404 outputs the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

The measurement section 405 may measure, for example, received power (e.g. RSRP), received quality (e.g. a RSRQ and a received SINR) and a channel state of the received signals. The measurement section 405 may output a measurement result to the control section 401.

(Hardware Configuration)

The block diagrams used to describe the embodiment illustrate blocks in function units. These function blocks (components) are realized by an arbitrary combination of hardware and/or software. Further, means for realizing each function block is not limited in particular. That is, each function block may be realized by one physically jointed apparatus or may be realized by a plurality of apparatuses formed by connecting two or more physically separate apparatuses by wires or by radio.

Figure 12:
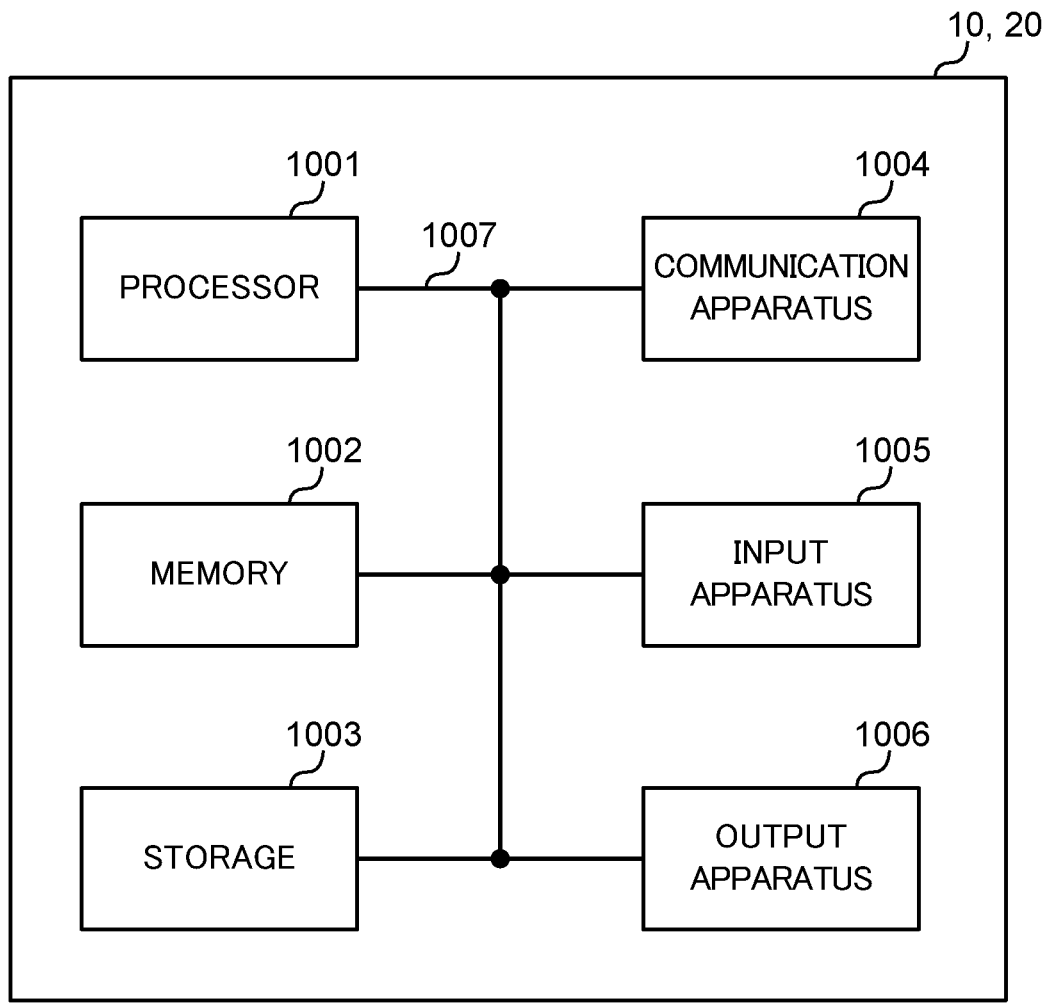
FIG. 12 is a diagram illustrating an example of hardware configurations of the radio base station and the user terminal according to one embodiment of the present invention.

For example, the radio base stations and the user terminal according to one embodiment of the present invention may function as a computer that performs processing of the radio communication method according to the present invention. FIG. 12 is a diagram illustrating an example of hardware configurations of the radio base station and the user terminal according to one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006, and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in the drawings or may be configured without including part of the apparatuses.

Each function of the radio base station 10 and the user terminal 20 is realized by causing hardware such as the processor 1001 and the memory 1002 to read predetermined software (program), and causing the processor 1001 to perform an arithmetic operation, and control communication in the communication apparatus 1004 and reading and/or writing of data in the memory 1002 and the storage 1003.

For example, the processor 1001 causes an operating system to operate and control the entire computer. The processor 1001 may be composed of a Central Processing Unit (CPU) including an interface for a peripheral apparatus, a control apparatus, an arithmetic apparatus and a register. For example, the baseband signal processing section 104 (204) and the call processing section 105 may be realized by the processor 1001.

Further, the processor 1001 reads programs (program codes), a software module or data from the storage 1003 and/or the communication apparatus 1004 out to the memory, and executes various types of processing according to the program, the software module or the data. Programs that cause a computer to execute at least part of the operations described in the above embodiment are used as the programs. For example, the control section 401 of the user terminal 20 may be realized by a control program stored in the memory 1002 and operated by the processor 1001 or other function blocks may be realized likewise, too.

The memory 1002 is a computer-readable recording medium and may be composed of at least one of, for example, a ROM (Read Only Memory), an EPROM (Erasable Programmable ROM) and a RAM (Random Access Memory). The memory 1002 may be referred to as a register, a cache or a main memory (main storage apparatus). The memory 1002 can store programs (program codes) and a software module that can be executed to carry out the radio communication method according to one embodiment of the present invention.

The storage 1003 is a computer-readable recording medium and may be composed of at least one of, for example, an optical disk such as a CD-ROM (Compact Disc ROM), a hard disk drive, a flexible disk, a magnetooptical disk and a flash memory. The storage 1003 may be referred to as an auxiliary storage apparatus.

The communication apparatus 1004 is hardware (transmission/reception device) that performs communication between computers via a wired and/or radio network, and is, for example, a network device, a network controller, a network card, and a communication module. For example, the transmission/reception antennas 101 (201), the amplifying sections 102 (202), the transmission/reception sections 103 (203) and the transmission path interface 106 may be realized by the communication apparatus 1004.

The input apparatus 1005 is an input device (e.g. a keyboard or a mouse) that receives an input from an outside. The output apparatus 1006 is an output device (e.g. a display or a speaker) that sends an output to the outside. In addition, the input apparatus 1005 and the output apparatus 1006 may employ an integrated configuration (e.g. touch panel).

Further, each apparatus such as the processor 1001 or the memory 1002 is connected by the bus 1007 that communicates information. The bus 1007 may be composed of a single bus or may be composed of buses that are different between apparatuses.

Further, the radio base station 10 and the user terminal 20 may be configured to include hardware such as a microprocessor, a Digital Signal Processor (DSP), an ASIC (Application Specific Integrated Circuit), a PLD (Programmable Logic Device) and a FPGA (Field Programmable Gate Array), and the hardware may realize part or all of each function block. For example, the processor 1001 may be mounted on at least one of these types of hardware.

In this regard, each term that is described in this description and/or each term that is necessary to understand this description may be replaced with terms having identical or similar meanings. For example, a channel and/or a symbol may be a signal (signaling). Further, a signal may be a message. Furthermore, a Component Carrier (CC) may be referred to as a cell, a frequency carrier and a carrier frequency.

Still further, a radio frame may be comprised of one or a plurality of periods (frames) in a time domain. One or a plurality of periods (frames) that configures a radio frame may be referred to as a subframe. Further, the subframe may be comprised of one or a plurality of slots in the time domain. Furthermore, the slot may be comprised of one or a plurality of symbols (OFDM symbols or SC-FDMA symbols) in the time domain.

The radio frame, the subframe, the slot and the symbol indicate time units for transmitting signals. The other names corresponding to radio frame, the subframe, the slot and the symbol may be used. For example, one subframe may be referred to as a Transmission Time Interval (TTI), a plurality of continuous subframes may be referred to as TTIs or one slot may be referred to as a TTI. That is, the subframe or the TTI may be a subframe (1 ms) according to existing LTE, may be a period (e.g. 1 to 13 symbols) shorter than 1 ms or may be a period longer than 1 ms.

In this regard, the TTI refers to, for example, a minimum time unit for scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI having a time length of 1 ms may be referred to as a normal TTI (a TTI according to LTE Rel.8 to 12), a normal TTI, a long TTI, a normal common, a normal subframe or a long subframe. The TTI shorter than the normal TTI may be referred to as a shortened TTI, a short TTI, a shortened subframe or a short subframe.

Resource Blocks (RBs) are resource block allocation units of a time domain and a frequency domain, and may include one or a plurality of continuous subcarriers in the frequency domain. Further, the RB may include one or a plurality of symbols in the time domain or may be a length of one slot, one subframe or one TTI. One TTI or one subframe may be comprised of one or a plurality of resource blocks. In this regard, the RB may be referred to as a Physical Resource Block (PRB: Physical RB), a PRB pair or a RB pair.

Further, the resource block may be comprised of one or a plurality of Resource Elements (REs). For example, one RE may be a radio resource domain of one subcarrier and one symbol.

In this regard, structures of the radio frame, the subframe, the slot and the symbol are only exemplary structures. For example, configurations such as the number of subframes included in a radio frame, the number of slots included in a subframe, the numbers of symbols and RBs included in a slot, the number of subcarriers included in a RB, the number of symbols in a TTI, a symbol length and a Cyclic Prefix (CP) length can be variously changed.

Still further, the pieces of information and parameters described in this description may be expressed by absolute values, may be expressed by relative values of predetermined values or may be expressed by other pieces of corresponding information. For example, a radio resource may be instructed by a predetermined index.

The pieces of information and the signals described in this description may be expressed by using one of various different techniques. For example, the data, the instructions, the commands, the pieces of information, the signals, the bits, the symbols and the chips mentioned in the above entire description may be expressed by voltages, currents, electromagnetic waves, magnetic fields or magnetic particles, optical fields, photons or arbitrary combinations thereof.

Further, software, instructions and information may be transmitted and received via transmission media. When, for example, the software is transmitted from websites, servers or other remote sources by using wired techniques (e.g. coaxial cables, optical fiber cables, twisted pairs and Digital Subscriber Lines (DSL)) and/or radio techniques (e.g. infrared rays and microwaves), these wired techniques and/or radio technique are included in a definition of the transmission media.

Further, the radio base station in the description may be read as the user terminal. For example, each example/embodiment of the present invention may be applied to a configuration where communication between the radio base station and the user terminal is replaced with communication between a plurality of user terminals (D2D: Device-to-Device). In this case, the user terminal 20 may be configured to include the functions of the radio base station 10. Further, words such as "uplink" and "downlink" may be read as "sides". For example, the uplink channel may be read as a side channel.

Similarly, the user terminal in this description may be read as the radio base station. In this case, the radio base station 10 may be configured to include the functions of the user terminal 20.

Each example/embodiment described in this description may be used alone, may be used in combination or may be switched and used when carried out. Further, notification of predetermined information (e.g. notification of "being X") may be not only explicitly performed but also implicitly performed (by, for example, not notifying this predetermined information).

Notification of information is not limited to the example/embodiment described in this description and may be performed by other methods. For example, the notification of the information may be performed by physical layer signaling (e.g. DCI (Downlink Control Information) and UCI (Uplink Control Information)), higher layer signaling (e.g. RRC (Radio Resource Control) signaling, broadcast information (MIB (Master Information Block) and SIB (System Information Block)), and MAC (Medium Access Control) signaling), other signals and combinations thereof. Further, the RRC signaling may be referred to as a RRC message and may be, for example, a RRC Connection Setup message or a RRC Connection Reconfiguration message. Furthermore, MAC signaling may be notified by, for example, a MAC Control Element (MAC CE).

Each example/embodiment described in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other appropriate radio communication methods and/or next-generation systems that are enhanced based on these systems.

Orders of the processing procedures, the sequences and the flowchart of each example/embodiment described in this description may be rearranged unless contradictions arise. For example, the method described in this description presents various step elements in an exemplary order and is not limited to the presented specific order.

As described above, the present invention has been described in detail, yet it is obvious for a person skilled in the art that the present invention is not limited to the embodiment described in the description. For example, the above embodiment may be used alone or may be used in combination. The present invention can be carried out as modified and changed embodiment without departing from the subject matter and scope of the present invention defined by the description of the scope of the claims. Accordingly, the disclosure of the description is intended for illustrative explanation, and does not have any restrictive meaning to the present invention.

The invention claimed is:

1. A terminal comprising:
a receiver that monitors a search space to detect downlink control information, the search space including a plurality of subsets to which precoding is applied; and
a processor that controls to perform transmission or reception of a shared channel based on the downlink control information,
wherein a subset, among the plurality of subsets included in the search space to be monitored to detect the downlink control information, and a demodulation reference signal (DMRS) corresponding to the subset are adjacently mapped from a beginning in a slot.

2. The terminal according to claim 1, wherein the receiver demodulates the plurality of subsets based on mutually different reference signals.

3. The terminal according to claim 2, wherein a subset and a reference signal corresponding to the subset are mapped together to a specific frequency range within the search space.

4. The terminal according to claim 2, wherein a subset and a reference signal corresponding to a different subset from the subset are mapped to different frequency ranges within the search space.

5. The terminal according to claim 1, wherein the processor controls to perform transmission or reception of the shared channel based on the downlink control information that is determined based on each downlink control information and/or at least one of received power, received quality and a received signal-to-interference power ratio of a reference signal associated with the downlink control information from multiple downlink control information received using the plurality of subsets.

6. The terminal according to claim 1, wherein the processor controls to perform transmission or reception of the shared channel based on the downlink control information that is determined based on given information included in at least one downlink control information from multiple downlink control information received using the plurality of subsets.

7. A radio communication method for a terminal, comprising:
monitoring a search space for detecting downlink control information, the search space including a plurality of subsets to which precoding is applied; and
controlling to perform transmission or reception of a shared channel based on the downlink control information,
wherein a subset, among the plurality of subsets included in the search space to be monitored to detect the downlink control information, and a demodulation reference signal (DMRS) corresponding to the subset are adjacently mapped from a beginning in a slot.

* * * * *